US006494803B2

(12) United States Patent
Suzuki et al.

(10) Patent No.: US 6,494,803 B2
(45) Date of Patent: Dec. 17, 2002

(54) HYDRAULIC CONTROL APPARATUS FOR AN AUTOMATIC TRANSMISSION

(75) Inventors: Akitomo Suzuki, Anjo (JP); Kenichi Tsuchida, Anjo (JP); Masaaki Nishida, Anjo (JP); Masahiro Hayabuchi, Anjo (JP); Takayuki Hisano, Anjo (JP); Takahiro Inoue, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 09/741,165

(22) Filed: Dec. 21, 2000

(65) Prior Publication Data

US 2001/0014638 A1 Aug. 16, 2001

(30) Foreign Application Priority Data

Dec. 27, 1999 (JP) ............................................. 11-371811
Nov. 17, 2000 (JP) ........................................ 2000-351227

(51) Int. Cl.[7] ............................................... F16H 31/00
(52) U.S. Cl. ......................... 475/119; 475/122; 477/80; 477/87
(58) Field of Search ................................. 475/119, 120, 475/122; 477/71, 80, 86, 87

(56) References Cited

U.S. PATENT DOCUMENTS

| 3,688,607 | A | | 9/1972 | Marlow ........................ 74/866 |
| 5,383,379 | A | | 1/1995 | Nioyama .................... 74/733.1 |
| 5,417,626 | A | | 5/1995 | Gierer ......................... 477/117 |
| 5,741,200 | A | * | 4/1998 | Taniguchi et al. ............. 477/93 |
| 6,302,822 | B1 | * | 10/2001 | Suzuki et al. ................ 477/143 |

FOREIGN PATENT DOCUMENTS

| EP | 1 031 770 A | | 8/2000 |
| EP | 1 039 179 A | | 9/2000 |
| JP | 53-8028 | | 3/1978 |
| JP | 170900 | * | 6/2000 |

* cited by examiner

Primary Examiner—Sherry Estremsky
Assistant Examiner—Tisha D. Lewis
(74) Attorney, Agent, or Firm—Oliff & Berridge, PLC

(57) ABSTRACT

To make it possible to maintain speeds during failures in an automatic transmission that does not have exclusive friction elements corresponding to the attainment of each speed. The hydraulic control apparatus of an automatic transmission, provided with control means 71–74 for supplying regulated pressure to each of the hydraulic servos 81–84 that are first through fourth friction elements to which hydraulic pressure is supplied from the oil path L1, and provided with switching valves (1)–(5) for cutting off the supply of hydraulic pressure to friction elements other than the friction elements that engage in each speed, on the upstream side of the supply paths L31, L32, L10, L11 and L12. Each switching valve is switched by hydraulic pressure (C1–C3, B1 pressures) regulated by the control means that achieve regulated pressure operating conditions during failures, and selective application of signal pressure (SoI, SoIB, SoIC pressures) output by the control means as operating means. In a speed that has been attained, the supply path to friction elements that are not to be engaged is cut off. Through this, even during failures the regulated pressure action of the control means corresponding to friction elements that are not to be engaged is ineffective, so the speed that has been attained is fixed.

26 Claims, 17 Drawing Sheets

| POSITION | | CLUTCH/BRAKE | | | | | | SOLENOID VALUE | | | | |
|---|---|---|---|---|---|---|---|---|---|---|---|---|
| | | C-1 | C-2 | C-3 | B-1 | B-2 | F-1 | SLC1 | SLC2 | SLC3 | SLB1 | SL1 |
| | | | | | | | | N-O | N-O | N-O | N-O | N-C |
| P | | | | | | | | ○ | ○ | ○ | ○ | × |
| R | | | | ○ | | ○ | | ○ | ○ | × | ○ | × |
| N | | | | | | | | ○ | ○ | ○ | ○ | × |
| D | 1ST | ○ | | | | △ | ○ | × | ○ | ○ | ○ | × |
| | 2ND | ○ | | | ○ | | | × | ○ | ○ | × | × |
| | 3RD | ○ | | ○ | | | | × | ○ | × | ○ | × |
| | 4TH | ○ | ○ | | | | | × | × | ○ | ○ | ○ |
| | 5TH | | ○ | ○ | | | | ○ | × | × | ○ | ○ |
| | 6TH | | ○ | | ○ | | | ○ | × | ○ | × | ○ |
| ELECTRIC FAILURE DURING DRIVING | 1ST | | | | | | | | | | | |
| | 2ND | ○ | | ○ | | | | × | × | × | × | × |
| | 3RD | | | | | | | | | | | |
| | 4TH | ○ | ○ | | | | | × | × | × | × | × |
| | 5TH | | ○ | ○ | | | | × | × | × | × | × |
| | 6TH | | ○ | | ○ | | | × | × | × | × | × |
| RE-STARTING TIME | | ○ | | ○ | | | | × | × | × | × | × |
| NOTES | ○ | ENGAGEMENT | | | | | | CURRENT PRESENT | | | | |
| | × | — | | | | | | CURRENT ABSENT | | | | |
| | △ | E/B TIME ENGAGEMENT | | | | | | | | | | |

N-O : NORMAL OPEN (OUTPUT HYDRAULIC PRESSURE DURING ABSENCE OF CURRENT)
N-C : NORMAL CLOSE (DOES NOT OUTPUT HYDRAULIC PRESSURE DURING ABSENCE OF CURRENT)

FIG.2

|  | C1 | C2 | C3 | B1 | B2 | F1 |
|---|---|---|---|---|---|---|
| P |  |  |  |  |  |  |
| R |  |  | O |  | O |  |
| N |  |  |  |  |  |  |
| 1 SPEED | O |  |  |  |  | O |
| 1 SPEED (ENGINE PRESSURE) | O | ⑤ |  |  | O |  |
| 2 SPEED | O |  |  | O | ⑥ |  |
| 3 SPEED | O |  | O | ④ |  |  |
| 4 SPEED | O | O | ② |  |  |  |
| 5 SPEED | ① | O | O | ④ |  |  |
| 6 SPEED | ① | O | O | ③ |  |  |
| RE-STARTING TIME | O | ⑤ | O | ④ |  |  |

| DRAIN ELEMENT (REFERENCE NUMBER) | VALVE NAME | SIGNAL PRESSURE |
|---|---|---|
| ① | C1 CUT-OFF VALVE | C2 PRESSURE AND C3 PRESSURE, C2 PRESSURE AND B1 PRESSURE |
| ② | B1-C3 CUT-OFF VALVE | C1 PRESSURE AND C2 PRESSURE |
| ③ | B1 APPLY RELAY VALVE | SLB1 |
| ④ | C3 APPLY RELAY VALVE | SLC3 |
| ⑤ | C2 SUPPLY RELAY VALVE | SOL1 |
| ⑥ | B2 CUT-OFF VALVE | C2 PRESSURE, B1 PRESSURE, C3 PRESSURE |

| SLB1 | SLB1 RELEASE VALVE | SLC3 |
|---|---|---|
| SLC3 | SLC3 RELEASE VALVE | C2 PRESSURE AND B1 PRESSURE |

FIG.5

|  | C1 | C2 | C3 | B1 | B2 | F1 |
|---|---|---|---|---|---|---|
| P |  |  |  |  |  |  |
| R |  |  | ○ |  | ○ |  |
| N |  |  |  |  |  |  |
| 1 SPEED | ○ |  |  |  |  | ○ |
| 1 SPEED (ENGINE PRESSURE) | ○ | ⑤ |  |  | ○ |  |
| 2 SPEED | ○ |  | ③ | ○ | ⑥ |  |
| 3 SPEED | ○ |  | ○ | ④ |  |  |
| 4 SPEED | ○ | ○ | ② |  |  |  |
| 5 SPEED | ① | ○ | ○ | ④ |  |  |
| 6 SPEED |  | ○ | ③ | ○ |  |  |
| RE-STARTING TIME | ○ | ⑤ | ③ | ○ |  |  |

| DRAIN ELEMENT (REFERENCE NUMBER) | VALVE NAME | SIGNAL PRESSURE |
|---|---|---|
| ① | C1 CUT-OFF VALVE | C2 PRESSURE AND C3 PRESSURE, C2 PRESSURE AND B1 PRESSURE |
| ② | B1-C3 CUT-OFF VALVE | C1 PRESSURE AND C2 PRESSURE |
| ③ | B1 APPLY RELAY VALVE | SLB1 |
| ④ | C3 APPLY RELAY VALVE | SLC3 |
| ⑤ | C2 SUPPLY RELAY VALVE | SOL1 |
| ⑥ | B2 CUT-OFF VALVE | C2 PRESSURE, B1 PRESSURE, C3 PRESSURE |

| SLB1 | SLB1 RELEASE VALVE | C3 PRESSURE AND D RANGE PRESSURE |
|---|---|---|
| SLC3 | SLC3 RELEASE VALVE | SLB1 |

FIG.7

|  | C1 | C2 | C3 | B1 | B2 | F1 |
|---|---|---|---|---|---|---|
| P |  |  |  |  |  |  |
| R |  |  | O |  | O |  |
| N |  |  |  |  |  |  |
| 1 SPEED | O |  |  |  |  | O |
| 1 SPEED (ENGINE PRESSURE) | O |  |  |  | O |  |
| 2 SPEED | O | ⑤ |  | O | ⑥ |  |
| 3 SPEED | O |  | O | ④ | ⑥ |  |
| 4 SPEED | O | O | ② |  | ⑥ |  |
| 5 SPEED | ① | O | O | ④ | ⑥ |  |
| 6 SPEED | ① | O | ③ | O | ⑥ |  |
| RE-STARTING TIME | O | ⑤ | O | ④ |  |  |

| DRAIN ELEMENT (REFERENCE NUMBER) | VALVE NAME | SIGNAL PRESSURE |
|---|---|---|
| ① | C1 CUT-OFF VALVE | C2 PRESSURE AND C3 PRESSURE, C2 PRESSURE AND B1 PRESSURE |
| ② | B1-C3 CUT-OFF VALVE | C1 PRESSURE AND C2 PRESSURE |
| ③ | B1 APPLY RELAY VALVE | SLB1 |
| ④ | C3 APPLY RELAY VALVE | SLC3 |
| ⑤ | C2 CUT-OFF VALVE | C1 PRESSURE AND C3 PRESSURE, C1 PRESSURE AND B1 PRESSURE |
| ⑥ | B2 CUT-OFF VALVE | C2 PRESSURE, B1 PRESSURE, C3 PRESSURE |

| SLB1 | SLB1 RELEASE VALVE | SLC3 |
|---|---|---|
| SLC3 | SLC3 RELEASE VALVE | C2 PRESSURE AND B1 PRESSURE |

FIG.10

| | C1 | C2 | C3 | B1 | B2 | F1 |
|---|---|---|---|---|---|---|
| P | | | | | | |
| R | | | ○ | | ○ | |
| N | | | | | | |
| 1 SPEED | ○ | | | | | ○ |
| 1 SPEED (ENGINE PRESSURE) | ○ | | | | ○ | |
| 2 SPEED | ○ | ⑤ | ③ | ○ | ⑥ | |
| 3 SPEED | ○ | ⑤ | ○ | ④ | ⑥ | |
| 4 SPEED | ○ | ○ | ② | | ⑥ | |
| 5 SPEED | ① | ○ | ○ | ④ | ⑥ | |
| 6 SPEED | | ○ | ③ | ○ | | |
| RE-STARTING TIME | ○ | ⑤ | ③ | ○ | | |

| DRAIN ELEMENT (REFERENCE NUMBER) | VALVE NAME | SIGNAL PRESSURE |
|---|---|---|
| ① | C1 CUT-OFF VALVE | C2 PRESSURE AND C3 PRESSURE, C2 PRESSURE AND B1 PRESSURE |
| ② | B1-C3 CUT-OFF VALVE | C1 PRESSURE AND C2 PRESSURE |
| ③ | B1 APPLY RELAY VALVE | SLB1 |
| ④ | C3 APPLY RELAY VALVE | SLC3 |
| ⑤ | C2 CUT-OFF VALVE | C1 PRESSURE AND C3 PRESSURE, C1 PRESSURE AND B1 PRESSURE |
| ⑥ | B2 CUT-OFF VALVE | C2 PRESSURE, B1 PRESSURE, C3 PRESSURE |

| SLB1 | SLB1 RELEASE VALVE | RANGE PRESSURE |
|---|---|---|
| SLC3 | SLC3 RELEASE VALVE | SLB1 |

FIG.12

|  | C-1 | C-2 | C-3 | B-1 | B-2 | F-1 |
|---|---|---|---|---|---|---|
| P |  |  |  |  |  |  |
| R |  |  | ○ |  |  | ○ |
| N |  |  |  |  |  |  |
| 1 SPEED | ○ |  |  |  |  | ○ |
| 1 SPEED (E/G BRAKE) | ○ | ⑤ |  |  | ○ |  |
| 2 SPEED | ○ |  |  | ○ |  |  |
| 3 SPEED | ○ |  | ○ | ④ |  |  |
| 4 SPEED | ○ | ○ | ② |  | ⑥ |  |
| 5 SPEED | ① | ○ | ○ | ④ |  |  |
| 6 SPEED |  | ○ | ③ | ○ |  |  |
| RE-STARTING TIME | ○ | ⑤ | ○ | ④ |  |  |

| DRAIN ELEMENT (REFERENCE NUMBER) | VALVE NAME | SIGNAL PRESSURE |
|---|---|---|
| ① | C1 RELEASE VALVE | C2, C3 C2, B1 |
| ② | B1-C3 RELEASE VALVE | C1, C2 |
| ③ | C3 RELEASE VALVE | C2, B1 |
| ④ | B1 RELEASE VALVE | C3 |
| ⑤ | C2-B2 SUPPLY RELAY VALVE | SOL1 |
| ⑥ | B2 CONTROL VALVE | C2 B1 C3 |

|  | C-1 | C-2 | C-3 | B-1 | B-2 | F-1 |
|---|---|---|---|---|---|---|
| P |  |  |  |  |  |  |
| R |  |  | O |  |  | O |
| N |  |  |  |  |  |  |
| 1 SPEED | O |  |  |  |  | O |
| 1 SPEED (E/G BRAKE) | O |  |  |  | O |  |
| 2 SPEED | O | ⑤ | ③ | O | ⑥ |  |
| 3 SPEED | O |  | O | ④ | ⑥ |  |
| 4 SPEED | O | O | ② | ② | ⑥ |  |
| 5 SPEED | ① | O | O | ④ |  |  |
| 6 SPEED |  | O | ③ | O |  |  |
| RE-STARTING TIME | O | ⑤ | O | ④ |  |  |

↕

| DRAIN ELEMENT (REFERENCE NUMBER) | VALVE NAME | SIGNAL PRESSURE |
|---|---|---|
| ① | C1 RELEASE VALVE | C2, C3 C2, B1 |
| ② | B1-C3 RELEASE VALVE | C1, C2 |
| ③ | C3 RELEASE VALVE | C2, B1 |
| ④ | B1 RELEASE VALVE | C3 |
| ⑤ | C2-B2 SUPPLY RELAY VALVE | SOL1 |
| ⑥ | B2 CONTROL VALVE | C2 B1 C3 |

FIG.17

HYDRAULIC CONTROL APPARATUS FOR AN AUTOMATIC TRANSMISSION

BACKGROUND OF THE INVENTION

1. Field of Invention

The invention relates to an automatic transmission mounted in a vehicle, and more particularly to a hydraulic control apparatus for controlling friction elements in such a transmission.

2. Description of Related Art

In the automatic transmissions of vehicles in recent times, a structure is employed wherein in the hydraulic pressure circuit that controls clutches and brakes (in this specification, these shall be referred to as "friction elements") used to achieve each speed, exclusive control means (combining a linear solenoid valve, a duty solenoid valve or a linear solenoid valve with a regulating valve) are provided for each hydraulic servo of each friction element, and these are each controlled independently in order to improve control. The control means in such a hydraulic pressure circuit is supposed to secure a certain level of running ability of the vehicle by accomplishing hydraulic output to the hydraulic servo even during signal failures, and is supposed to be a normally open valve for accomplishing hydraulic output during times of no signal. Consequently when all of the control means simultaneously experience signal failures or sticking failures, an interlock condition arises wherein friction elements that originally were not to engage simultaneously engage. In order to prevent such a condition, technology for avoiding interlocking even in the event of the control means supplying hydraulic pressure because of an electrical failure or sticking of the valves or the like (hereinafter, collectively referred to as "failures") when the vehicle is moving forward has been disclosed in Japan Patent 53-8028.

In the aforementioned art, it is possible to prevent interlocking by providing an interlock valve (134, 136, 138 and 140 in FIG. 2 of the aforementioned disclosure) for providing hydraulic pressure to each friction element as a signal pressure during failures. Furthermore, the interlock valve is a valve used to cut off all hydraulic pressure to friction elements disengaged at preset speeds, and hence when a failure occurs at a preset speed, that speed is fixed. As a result, it is possible to resolve the problems of insufficient drive force or over-revving by maintaining a constant speed when failures occur.

However, the aforementioned art is such that each speed is achieved by engaging a friction element (54) that is always engaged with exclusive friction elements (48, 52, 56, 58) engaged in each speed, and consequently, the structure is such that only hydraulic pressure to the exclusive friction elements is applied in the aforementioned interlocking. Accordingly, in a gear train where there are no exclusive friction elements in each speed, the problem arises that this technology cannot be adapted.

Hence, it is the general objective of the invention to provide a hydraulic control apparatus that can maintain the achieved speed in the event of failures in an automatic transmission comprising a plurality of speeds using the same friction elements in achieving differing speeds, that is to say in an automatic transmission in which exclusive friction elements do not exist for each speed.

SUMMARY OF THE INVENTION

In order to achieve the above-described objective, in a first aspect a hydraulic control apparatus for an automatic transmission, of the type of hydraulic control apparatus provided with a plurality of friction elements and hydraulic servos for operating such, and wherein a plurality of speeds can be achieved by engaging at least two friction elements at a time out of the plurality of friction elements; and provided with a switching means for cutting off hydraulic control to the friction elements other than the friction elements engaged in order to achieve each speed within the plurality of speeds; wherein the plurality of speeds includes a third speed which, from among the friction elements, engages at least the first and third friction element and disengages the second friction element, a fourth speed which engages the first and second friction elements and disengages the third friction element, and a fifth speed which engages the second and third friction elements and disengages the first friction element; and said switching means includes a first switching valve which cuts off hydraulic control to the first friction element by applying, as a signal pressure, hydraulic pressure to the third friction element engaged in at least the third and fifth speeds and the second friction element engaged in the fifth speed, and a second switching valve that cuts off hydraulic control to the third friction element by applying, as a signal pressure, hydraulic pressure to the first friction element engaged in the third and fourth speeds and the second friction element engaged in the fourth speed.

In the above-described structure, it is effective as a second aspect for the structure to be further equipped with a plurality of control means capable of adjusting the hydraulic pressure to each hydraulic servo that operate the plurality of friction elements; wherein the hydraulic pressure from the plurality of control means is provided to each of the hydraulic servos.

Furthermore, in the above-described structure, a third aspect is effective for the structure to be provided with a hydraulic pressure source and first and second oil paths connecting the hydraulic pressure source with the hydraulic servos of the first and third friction elements, such that from among the plurality of control means, the first and second control means are positioned on these first and second oil paths; and the first and second switching valves are respectively positioned on the first and second oil paths, and cut off the supply of hydraulic pressure from the hydraulic pressure source to the other hydraulic servos by a hydraulic pressure being applied on the downstream side of the control means regulating the hydraulic pressure to the engaged friction elements.

In addition, in the above-described structure, a fourth aspect is effective in the structure for switching means to be such that the hydraulic pressure other than the pressure on the other friction elements, to which the hydraulic pressure supply is cut off, is applied as a signal pressure.

In addition, a fifth aspect is the above-mentioned plurality of friction elements may further include a fourth friction element, with the fourth friction element disengaged in the third, fourth and fifth speeds.

In addition, a structure may also be employed as a sixth aspect wherein the plurality of speeds further includes a second speed that engages the first and fourth friction elements and disengages the second and third friction elements, and a sixth speed that engages the second and fourth friction elements and disengages the first and third friction elements; and the first switching valve cuts off the hydraulic pressure supply to the first friction element by applying, as a signal pressure, a hydraulic pressure to the fourth friction element that is engaged at least in the case of the second speed, and a hydraulic pressure on the second friction element engaged in the case of the sixth speed.

In addition, a structure may also be employed according to a seventh aspect wherein the switching means includes a third switching valve capable of cutting of the hydraulic pressure supply to the second friction element, and the third switching valve is operated by hydraulic pressure to a friction element that engages in speeds where the second friction element is disengaged.

Or, a structure may be employed according to an eighth aspect wherein the switching means includes a third switching valve capable of cutting off the hydraulic pressure supply to the second friction element, wherein the third switching valve is operated by hydraulic pressure other than the hydraulic pressure to a friction element that engages in speeds where the second friction element is disengaged.

In the above-mentioned case, as a ninth aspect it is effective for the hydraulic pressure other than the hydraulic pressure to be a friction element is a solenoid pressure output by electrical control.

In addition, a structure may be employed as a tenth aspect wherein the first switching valve capable of cutting off the hydraulic pressure supply to the first friction element has a first operating means that operates switching of the first switching valve.

In the above-mentioned case, it is effective to employ a structure as an eleventh aspect wherein the first operating means cuts off the hydraulic pressure supply to the first friction element by switching the first switching valve by means of hydraulic pressure to the friction elements engaged in fifth speed, in which the second and third friction elements are engaged and the first and fourth friction elements are disengaged, and friction elements engaged in sixth speed, in which the second and fourth friction elements are engaged and the first and third friction elements are disengaged.

In addition, a structure may be employed in a twelfth aspect wherein the switching means is composed of a first group of switching valves capable of cutting off the hydraulic pressure supply to the third friction element, and the first group of switching valves has a first group of operating means for operating the switching thereof.

In addition, a structure may also be employed in a thirteenth aspect wherein the first group of operating means cuts off the hydraulic pressure supply to the third friction element by switching the first group of switching valves by means of hydraulic pressure (C1 apply pressure and C2 apply pressure in fourth speed; C2 apply pressure along with B1 apply pressure and B1 solenoid pressure in sixth speed) to the friction elements engaged in fourth speed, in which the first and second friction elements are engaged and the third and fourth friction elements are disengaged, and friction elements engaged in sixth speed, in which the second and fourth friction elements are engaged and the first and third friction elements are disengaged.

In addition, a structure may also be used in a fourteenth aspect wherein the first group of switching valves comprises a first switching valve of the first group and second switching valves of the first group, and the first switching valve of the first group cuts off the hydraulic pressure supply to the third friction element through hydraulic pressure to the friction elements engaged in the fourth speed in which the first and second friction elements engage and the third and fourth friction elements disengage, and the second switching valves of the first group cut off the hydraulic pressure supply to the third friction element through hydraulic pressure to the friction elements engaged in the sixth speed in which the second and fourth friction elements engage and the first and third friction elements disengage.

In the above-described structure, a structure may also be used in a fifteenth aspect wherein the switching means includes a second group of switching valves capable of cutting off the hydraulic pressure supply to the fourth friction element, and is further provided with a second group of operating means for operating switching of the second group of switching valves.

In addition, a structure of a sixteenth aspect may be used wherein the second group of operating means cuts off the hydraulic pressure supply to the fourth friction element by switching the second group of switching valves through hydraulic pressure (C3 solenoid pressure in third speed, C1 apply pressure and C2 apply pressure in fourth speed, and C3 solenoid pressure in fifth speed) to the friction elements engaged in third speed in which the first and third friction elements engage and the second and fourth friction elements disengage, fourth speed in which the first and second friction elements engage and the third and fourth friction elements disengage, and fifth speed in which the second and third friction elements engage and the first and fourth friction elements disengage.

In addition, a structure of a seventeenth aspect may be used wherein the second group of switching valves comprises a first switching valve of the second group and second switching valves of the second group, and the first switching valve of the second group cuts off the hydraulic pressure supply to the fourth friction element by means of hydraulic pressure to the friction elements engaged in fourth speed in which the first and second friction elements engage and the third and fourth friction elements disengage, and the second switching valve of the second group cuts off the hydraulic pressure supply to the fourth friction element by switching the second group of switching valves by means of hydraulic pressure to the friction elements engaged in third speed in which the first and third friction elements engage and the second and fourth friction elements disengage, and fifth speed in which the second and third friction elements engage and the first and fourth friction elements disengage.

In addition, a structure may be used in an eighteenth aspect wherein the switching means includes a third switching valve capable of cutting off the supply of hydraulic pressure to the second friction element, and is further provided with a third operating means that operates switching of the third switching valve.

In addition, a structure may also be used in a nineteenth aspect wherein the third operating means cuts off the hydraulic pressure supply to the second friction element by switching the third switching valve by means of hydraulic pressure (C1 apply pressure and B1 apply pressure in second speed, and C1 apply pressure and C3 apply pressure in third speed) to the friction elements engaged in second speed in which the first and fourth friction elements engage and the second and third friction elements disengage, and third speed in which the first and third friction elements engage and the second and fourth friction elements disengage.

In addition, a structure may also be used in a twentieth aspect wherein the switching means includes a third switching valve capable of cutting off the supply of hydraulic pressure to the second friction element, and is further provided with a third operating means for operating switching of the third switching valve.

In addition, a structure may also be used in a twenty-first aspect wherein the third operating means is capable of cutting off the supply of hydraulic pressure to the second friction elements by means of hydraulic pressure unrelated to the hydraulic pressure to the friction elements engaged in speeds in which the second friction element disengages.

In addition, a structure of a twenty-second aspect may also be used wherein the second switching valve of the second group cuts off the supply of hydraulic pressure to the fourth friction element by means of hydraulic pressure to the third friction element.

In addition, a structure of a twenty-third aspect may also be used wherein the second switching valve of the first group cuts off the supply of hydraulic pressure to the third friction element by means of hydraulic pressure to the second friction element and fourth friction element.

In addition, a structure may also be used in a twenty-fourth aspect wherein the second switching valve of the first group cuts off the supply of hydraulic pressure to the third friction element by means of hydraulic pressure to the fourth friction element.

Next, the invention in a twenty-fifth aspect is of the type of hydraulic control apparatus provided with a plurality of friction elements and hydraulic servos for such, and wherein a plurality of speeds (first through sixth speeds) are achieved by appropriate operation of the plurality of friction elements, and at least one friction element out of the plurality of friction elements is engaged in two or more speeds; wherein a plurality of switching valves capable of cutting off the supply of hydraulic pressure to each of the hydraulic servos is provided between the hydraulic pressure source and each of the hydraulic servos that operate the plurality of friction elements; and operating means for operating switching of a specific switching valve out of the plurality of switching valves so that the supply of hydraulic pressure is cut off to the friction elements disengaged in a predetermined speed out of the plurality of speeds, are also provided.

In the above-mentioned structure, a structure may also be used in a twenty-sixth aspect wherein the plurality of friction elements includes at least first through fourth friction elements; the plurality of switching valves includes first through fourth switching valves that are positioned between the hydraulic pressure source and each hydraulic servo that operates the first through fourth friction elements, and that are capable of cutting off the supply of hydraulic pressure to the respective hydraulic servos; and the operating means includes first through fourth operating means that operate switching of the first through fourth switching valves so that the hydraulic pressure is cut off to the friction elements disengaged at a predetermined speed out of the plurality of speeds.

With the structure of the aforementioned first aspect, when in fourth speed the hydraulic pressure to the third friction element is cut off with the hydraulic pressure to the first friction element as a signal pressure, hydraulic pressure to the second friction element engaged in fourth speed is also applied as a signal pressure, and in addition, when in fifth speed the hydraulic pressure to the first friction element is cut off with the hydraulic pressure to the third friction element as a signal pressure, hydraulic pressure to the second friction element engaged in fifth speed is also applied as a signal pressure, and through this fourth or fifth speed is fixed even if a failure arises in that speed. In addition, third speed is also achieved with certainty.

Next, with the structure of the second aspect, it is possible to achieve the aforementioned efficacy even when a situation arises in which hydraulic pressure is output through failure of each control means.

Furthermore, with the structure of the third aspect, control linked to the second and third friction elements is established for the first friction element, and control linked to the first and second friction elements is established for the third friction element. As a result, fixation of the speed during failures is possible for third through fifth speeds.

Next, with the structure of the fourth aspect, the supply of hydraulic pressure to the hydraulic servos of the friction elements that are to maintain engagement is not cut off by the mutual action of the switching valves, and consequently it is not necessary to do processes such as adding separate signal pressure application circuits for self-maintenance.

In addition, with the structure of the fifth aspect, when there is a fourth friction element for achieving another speed that does not participate in achieving the third through fifth speeds, it is possible to achieve fixing of the third through fifth speeds during failures.

Furthermore, with the structure of the sixth aspect, when in sixth speed, that speed is fixed even if failures arise by applying hydraulic pressure to the second friction element and to the fourth friction element as signal pressures. In addition, it becomes possible to supply hydraulic pressure to the first friction element when in second speed, so that it is possible to achieve second speed with certainty.

Furthermore, with the structure of the seventh aspect, during failures in speeds where disengagement of the second friction element is to be maintained, the third switching valve acts through the hydraulic pressure of the engaged friction elements to prevent the supply of hydraulic pressure, and through this the disengagement status of the second friction element is maintained with certainty.

In addition, with the structure of the eighth aspect, during failures in speeds where disengagement of the second friction element is to be maintained, the third switching valve acts through hydraulic pressure other than of the engaged friction elements to prevent the supply of hydraulic pressure, and through this the disengagement status of the second friction element is maintained with certainty without regard to the speed that is achieved.

In particular, with the structure of the ninth aspect, in the aforementioned case, by setting up the third switching valve to cut off when solenoid pressure is not output, it is possible to achieve the disengagement status of the second friction element with certainty without regard to other friction elements during failures in speeds where disengagement of that element is to be maintained.

Next, with the structure of the tenth aspect, it is possible to operate the first friction element with the first operating means corresponding thereto.

In particular, with the structure of the eleventh aspect, it is possible to make the first friction element a friction element that disengages in fifth and sixth speeds.

Next, with the structure of the twelfth aspect, it is possible to operate the third friction element with the first group of operating means corresponding thereto.

In particular, with the structure of the thirteenth aspect, it is possible to make the third friction element a friction element that disengages in fourth and sixth speeds.

In particular, with the structure of the fourteenth aspect, for the third friction element, engagement in fourth speed is prevented by the action of the first switching valve of the first group, and engagement in sixth speed is prevented by the action of the second switching valve of the first group.

Next, with the structure of the fifteenth aspect, it is possible to operate the fourth friction element with the second group of operating means corresponding thereto.

In particular, with the structure of the sixteenth aspect, it is possible to make the fourth friction element a friction element that disengages in fourth and fifth speeds.

In particular, with the structure of the seventeenth aspect, for the fourth friction element, engagement in fourth speed is prevented by the action of the first switching valve of the second group, and engagement in fifth speed is prevented by the action of the second switching valve of the second group.

Next, with the structure of the eighteenth aspect, it is possible to operate the second friction element with the third operating means corresponding thereto.

In particular, with the structure of the nineteenth aspect, it is possible to make the second friction element a friction element that disengages in second and third speeds.

Next, with the structure of the twentieth aspect, for the second friction element, independent disengagement control is possible. Accordingly, by making the second friction element correspond to a friction element on the low speeds side with a low possibility of being in use during normal running of the vehicle, it is possible to prevent the circuit structure from becoming complex in order to fix a speed on the high speed side during failures.

In particular, with the structure of the twenty-first aspect, for the second friction element, independent disengagement control is possible without regard to the operation of other friction elements.

In particular, with the structure of the twenty-second aspect, during failures in speeds in which the third friction element is an engaged element, it is possible to prevent, with certainty, interlocking through tie-up of the fourth friction element.

In particular, with the structure of the twenty-third aspect, during failures in speeds in which the second friction element and the fourth friction element are engaged elements, it is possible to prevent, with certainty, interlocking through tie-up of the third friction element.

In particular, with the structure of the twenty-fourth aspect, during failures in speeds in which the fourth friction element is an engaged element, it is possible to prevent with certainty interlocking through tie-up of the third friction element.

Next, with the structure of the twenty-fifth aspect, it is possible to selectively disengage each friction element by placing a switching valve respectively in each hydraulic servo that operates each friction element and, thus, it is possible to obtain the efficacy of being able to fix each speed when a failure occurs in that speed.

In addition, with the structure of the twenty-sixth aspect, fixing during failure becomes possible for four speeds, and hence fixing of speeds corresponding to substantially all speeds during normal vehicle operation becomes possible.

BRIEF DESCRIPTION OF THE DRAWINGS

The invention will be described with reference to the drawings, in which:

FIG. 2 is a table showing the operations of the gear train through the hydraulic control apparatus of the first embodiment;

FIG. 5 is a table comparing and contrasting the relationships among the hydraulic pressure supply and exhaust of each hydraulic servo, the speeds and the action of each valve in the hydraulic control apparatus of the first embodiment;

FIG. 7 is a table comparing and contrasting the relationships among the hydraulic pressure supply and exhaust of each hydraulic servo, the speeds and the action of each valve in the hydraulic control apparatus of the second embodiment;

FIG. 10 is a table comparing and contrasting the relationships among the hydraulic pressure supply and exhaust of each hydraulic servo, the speeds and the action of each valve in the hydraulic control apparatus of the third embodiment;

FIG. 12 is a table comparing and contrasting the relationships among the hydraulic pressure supply and exhaust of each hydraulic servo, the speeds and the action of each valve in the hydraulic control apparatus of the fourth embodiment;

FIG. 17 is a table comparing and contrasting the relationships among the hydraulic pressure supply and exhaust of each hydraulic servo, the speeds and the action of each valve in the hydraulic control apparatus of the sixth embodiment.

DETAILED DESCRIPTION OF PREFERRED EMBODIMENTS

Figure 1:
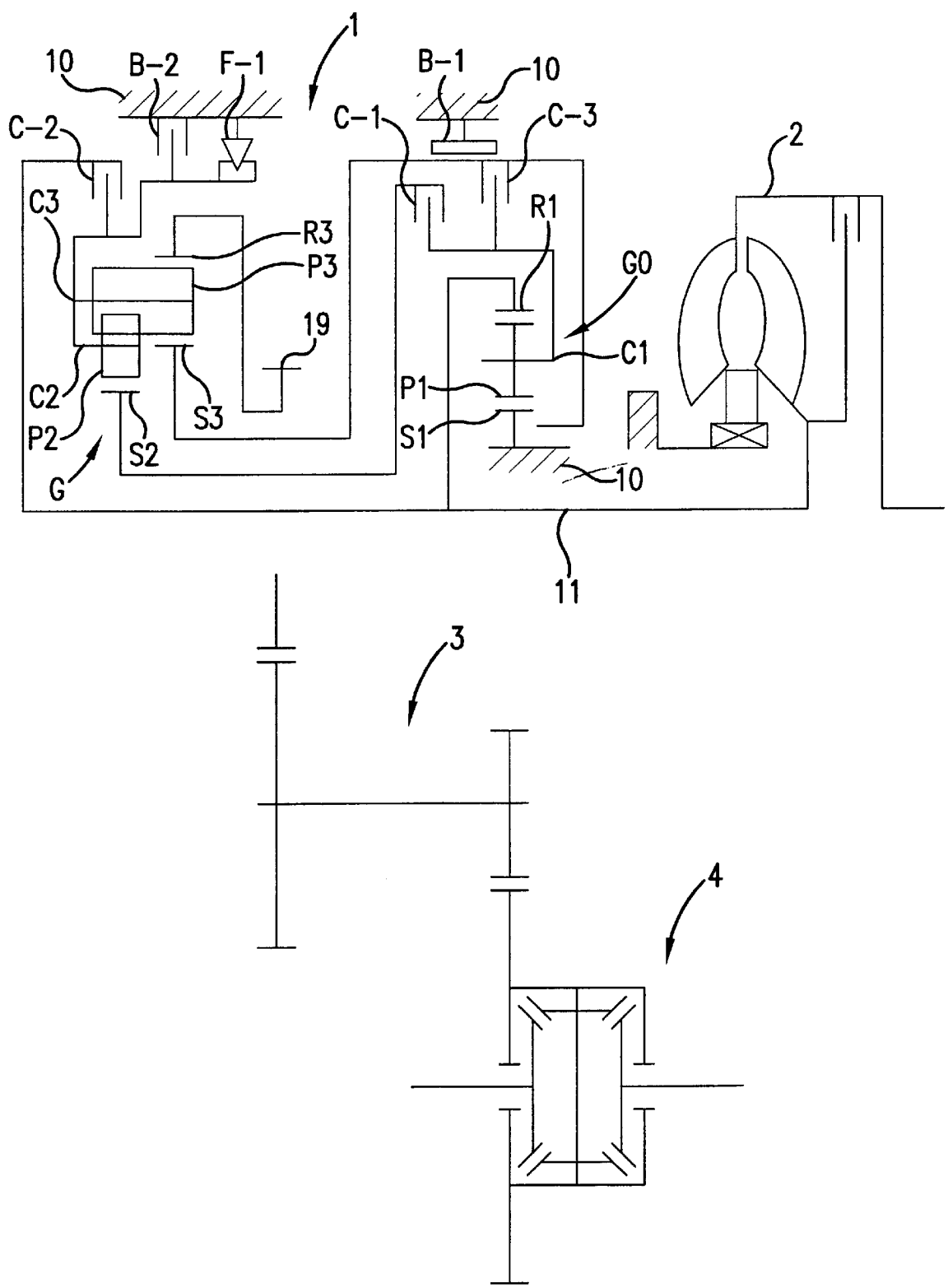
FIG. 1 is a schematic diagram showing the gear train in a six speed automatic transmission controlled by a hydraulic control system according to a first embodiment of the invention.

The preferred embodiments of the invention are described below with reference to the attached drawings. FIG. 1 is a schematic diagram showing the gear train in a first embodiment of the invention applied to an automatic transmission with six forward speeds and one reverse speed, with the axles shown unfolded in a common plane. As shown in the drawing, the automatic transmission is a trans-axle having three axles. More specifically, a torque converter 2 with a lock-up clutch and a planetary gear transmission apparatus 1 are provided on the first axle, a counter gear mechanism 3 is provided on the second axle and a differential gearing 4 is provided on the third axle. The automatic transmission is coupled to an engine (not shown) through the torque converter 2 that is provided on the front side of a power transmission path with respect to the planetary gear transmission apparatus 1, and is also coupled to right and left axles (not shown) through the counter gear mechanism 3 and the differential gearing 4 which are provided on the rear side of the power transmission path.

The planetary gear transmission apparatus 1 comprises a Ravigneaux planetary gear set G and a planetary gear G0 that inputs a reduced rotation into the planetary gear set G. The planetary gear set G comprises a small-diameter sun gear S2, a large-diameter sun gear S3, a long pinion P3 that mutually mates and also mates with the large-diameter sun gear S3, a short pinion P2 that mates with the small-diameter sun gear S2, carriers C2 (C3) that support the pair of pinions, and a ring gear R3 that mates with the long pinion P3. In addition, the planetary gear G0 for reducing rotation is composed of three elements: a sun gear S1, a pinion P1 mating therewith and a carrier C1 that supports pinion P1, and a ring gear R1 that mates with the pinion P1.

The small-diameter sun gear S2 of the planetary gear set G is coupled to the carrier C1 of the reduction planetary gear G0 by a first clutch C-1 (hereinafter, simply referred to as "C1 clutch"), the large-diameter sun gear S3 is coupled to the same carrier C1 of the reduction planetary gear G0 by a third clutch C-3 (hereinafter, simply referred to as "C3 clutch") and is engagable to a case 10, for stopping, by a first brake B-1 (hereinafter, simply referred to as "B1 brake"), the carrier C2 (C3) is coupled to an input shaft 11 by a second clutch C-2 (hereinafter, simply referred to as "C2 clutch) and is engagable to the case 10, for stopping, by a second brake B-2 (hereinafter, simply referred to as "B2 brake"), and the ring gear R3 is coupled to a counter drive gear 19 as an output element. In addition, a one-way clutch F-1 is positioned in parallel with the B2 brake. The reduction planetary gear G0 is such that the sun gear SI thereof is anchored to the transmission case 10, the ring gear Ri thereof is coupled to the input shaft 11, the carrier C1 thereof is coupled to the small-diameter sun gear S2 of the planetary gear set G by the C1 clutch, and is coupled to the large-diameter sun gear S3 of the planetary gear set G by the C3 clutch.

According to the planetary gear transmission apparatus 1 structured as described, each of the above-mentioned clutches and brakes is provided with a hydraulic servo which is formed by a piston/cylinder mechanism for engaging and disengaging the clutches and brakes with and from the respective friction-engaging members, as well known in the art. Through control by a hydraulic control apparatus and an electronic control apparatus (not shown), the friction-engaging members are engaged and disengaged, and speed changes are accomplished, in accordance with the supply and discharge of a hydraulic pressure to and from each hydraulic servo by a hydraulic pressure control apparatus provided in the transmission case 10, on the basis of the vehicle load within the speed range corresponding to the range selected by the driver. FIG. 2 is a table showing the relationship between the action of each solenoid valve in the hydraulic control apparatus and each clutch and brake in the planetary gear transmission apparatus 1, and the speeds attained thereby. In the relationship between each clutch and brake and each speed in the figure, the mark o indicates engagement, the mark Δ indicates engagement during engine reduction and a blank indicates disengagement, while in the relationship between each solenoid valve and each speed, the mark o indicates providing an electric current and the mark x indicates the electric current is off.

A first speed (1ST) of the gear train is attained by automatic engagement of the one-way clutch F-1 that corresponds to engagement of the C1 clutch and the B2 brake. In this case, rotation from the input shaft 11 that has been braked via the reduction planetary gear G0 is input to the small-diameter sun gear S2 via the C1 clutch, obtains a reaction force from the carrier C2 (C3) stopped by engagement with the one-way clutch F-1, and the braked rotation of the maximum gear ratio of the ring gear R3 is output to the counter drive gear 19.

Next, a second speed (2ND) is attained by engagement of the C1 clutch and the B1 brake. In this case, rotation from the input shaft 11, that has been braked via the reduction planetary gear G0 is input to the small-diameter sun gear S2 via the C1 clutch, obtains a reaction force from the large-diameter sun gear S3 stopped by engagement with the B1 brake, and the braked rotation of the ring gear R3 is output to the counter drive gear 19. The reduction ratio in this case is smaller than in first speed (1ST).

In addition, a third speed (3RD) is attained by simultaneous engagement of the C1 clutch and the C3 clutch. In this case, rotation from the input shaft 11 that has been braked via the reduction planetary gear G0 is input simultaneously to the small-diameter sun gear S2 and the large-diameter sun gear S3 via the C1 clutch and the C3 clutch, and the planetary gear set G is directly coupled together. As a result, the input rotation at both sun gears and the rotation of the ring gear R3 at the same speed are output to the counter, drive gear 19 as rotations braked with respect to the rotation of the input shaft 11.

Moreover, a fourth speed (4TH) is attained by simultaneous engagement of the C1 clutch and the C2 clutch. In this case, on the one hand, rotation from the input shaft 11 that has been braked via the reduction planetary gear G0 is input to the sun gear S2 via the C1 clutch, while, on the other hand, unbraked rotation input via the C2 clutch from the input shaft 11 is input to the carrier C2 (C3). Thus rotation at an intermediate speed between these two input rotations is output to the counter drive gear 19 as the rotation of the ring gear R3 slightly braked by the rotation of the input shaft 11.

Next, a fifth speed (5TH) is attained by simultaneous engagement of the C2 clutch and the C3 clutch. In this case, on the one hand, rotation from the input shaft 11, that has been braked via the reduction planetary gear G0, is input to the sun gear S3 via the C3 clutch, while, on the other hand, unbraked rotation input via the C2 clutch from the input shaft 11 is input to the carrier C2 (C3). As a result, rotation of the ring gear R3, slightly increased from the rotation of the input shaft 11, is output to the counter drive gear 19.

Furthermore, a sixth speed (6TH) is attained by engagement of the C2 clutch and the B1 brake. In this case, unbraked rotation from the input shaft 11 via the C2 clutch is input only to the carrier C2 (C3), and further increased rotation of the ring gear R3, which obtains a reaction force from the sun gear S3, that is stopped by engagement with the B1 brake, is output to the counter drive gear 19.

Furthermore, a reverse speed (REV) is attained by engagement of the C3 clutch and the B2 brake. In this case, a rotation from the input shaft 11, that has been braked via the reduction planetary gear G0, is input to the sun gear S3 through the C3 clutch. The result is reverse rotation of a large gear ratio of the ring gear R3, which obtains a reaction force from the carrier C3 stopped by engagement of the B2 brake, is output to the counter drive gear 19.

Figure 3:
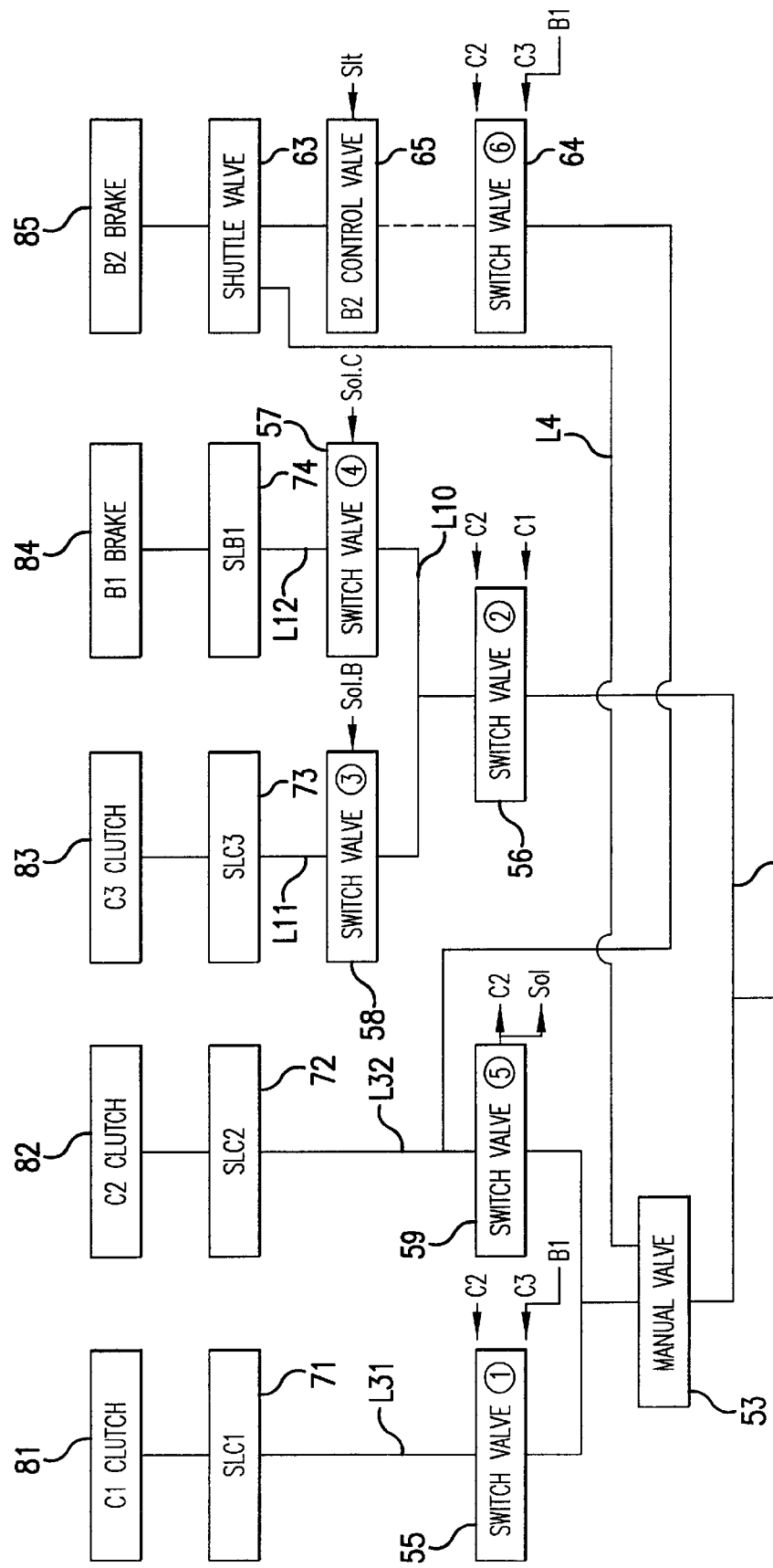
FIG. 3 is a summary circuit diagram of the hydraulic control apparatus of the first embodiment.

With an automatic transmission comprising such a gear train structure, as shown by the relationship between engagement of each friction element and the attained speeds in the action table of FIG. 2, there are no exclusive friction elements for each speed, and each of the six speeds is attained by engagement of at least two friction elements out of the plurality of friction elements. Further, each friction element is engaged in two or more of the speeds. Hence, as shown schematically in the rough circuit structure of FIG. 3, the hydraulic control apparatus is composed such that for the C1 clutch, as a first friction element, and the C2 clutch, as a second friction element, hydraulic pressure is supplied through a manual valve 53 from the line pressure oil path L1 as a hydraulic pressure source. The C3 clutch, as a third friction element, and the B1 brake, as a fourth friction element, have hydraulic pressure supplied directly from the line pressure oil path L1 in the same manner. Switching valves 55–59 are provided, on the upstream side of the supply paths L31, L32, L10, L11 and L12 of the respective hydraulic servos 81–84, as switching means afor cutting off the supply of hydraulic pressure to the friction elements other than the friction elements engaged in order to attain each speed. In the figure, the elements labeled with reference numbers 71–74 indicate control means for regulating the pressure supplied to each hydraulic servo. In this embodiment, the hydraulic pressure regulated through the elements 71–74 and the signal pressure output from the elements 71–74 is used in the switching operation of the switching valves 55–59. Hence the control means also serves as an operation means for each of the switching valves 55–59.

Figure 4:
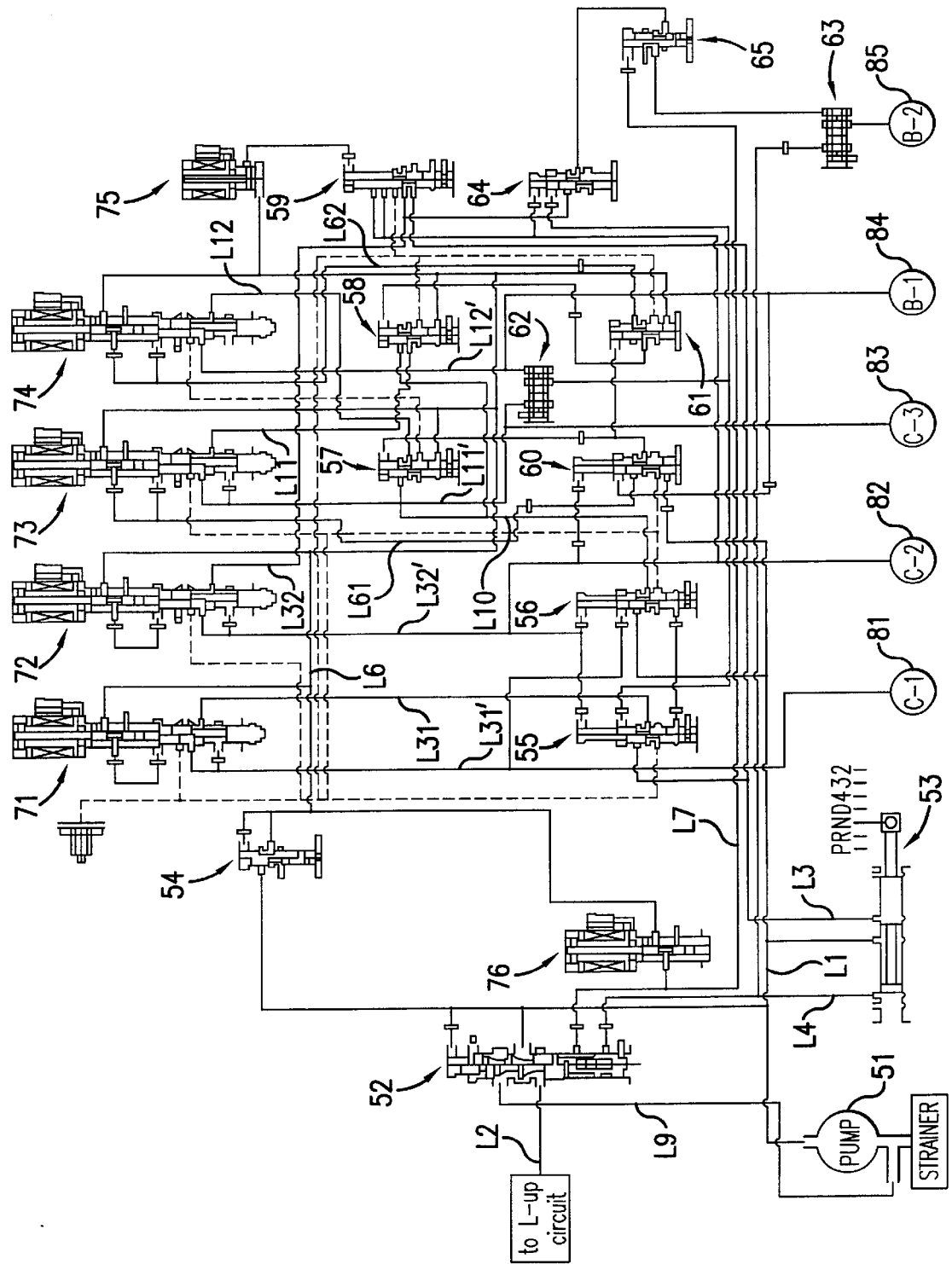
FIG. 4 is a circuit diagram of the hydraulic control apparatus of the first embodiment.

FIG. 4 is a circuit diagram showing details of the hydraulic control apparatus. The hydraulic pressure circuit comprises a circuit that regulates pressure while exhausting a hydraulic pressure, that is sucked up by an oil pump 51 as a hydraulic pressure generating means and ejected into a line pressure oil path L1, to a drain oil path L9 and a secondary pressure oil path line L2 for the lock-up clutch through a primary regulator valve 52; creates the appropriate line pressure in accordance with the running load of the vehicle; and supplies and exhausts the line pressure to the hydraulic servos 81–85 of each friction element with pressure and direction controlled by each valve in the circuit with the line pressure as a reference pressure for control.

The relationship of each valve and oil path connection comprising this circuit is described below. First, the primary regulator valve 52 comprises a spring-loaded spool and a regulator valve provided with a plunger abutted to the spring-loaded side spool edge. The primary regulator valve 52 is provided with an input port connected to the line pressure oil path L1, an output port leading to the secondary pressure oil path L2, and a drain port leading to the intake side of the oil pump via the drain oil path L9. In the spool which controls the level of communication of these ports, direct feedback pressure from the line pressure is applied via an orifice in opposition to a spring force. Further, a throttle pressure output by a throttle solenoid valve 76 is applied in the direction of overlapping the spring force. At the proper line pressure, the primary regulator valve 52 reduces the level of communication to the drain port and primarily supplies the surplus pressure to the secondary pressure oil path L2. When the signal pressure that is applied increases, the level of communication to the drain port is increased, the drain amount increases and the line pressure in the line pressure oil path L1 is maintained at a predetermined value.

The line pressure oil path L1, on the one hand, is connected to a modulator valve 54 that supplies the reference pressure for creation of a solenoid signal pressure to each solenoid valve 71–75 acting as control means and operation means and, on the other hand, is connected to each spool edge side receptor part of the B1-C3 cut-off valve 56 and the SLC3 release valve 60 acting as the second switching valve, and is also connected to the input port of the B1-C3 cut-off valve 56.

The manual valve 53 is a spool valve having seven positions, that can be switched through operation of a switch lever by the vehicle driver, as is known in the art. That is to say, the manual valve 53 has a "P" position that closes the input port connected to the line pressure oil path L1 through the action of the spool; an "R" position that connects the input port to the R range output port, and closes and drains the other output ports; an "N" position that closes the input port relative to all output ports; "D", "4" and "3" positions that connect the input port to the D range output port and drains the R range output port; and a "2" position that connects the input port to both the D range output port and the second D range output port, and drains the R range output port. The D range output port of the manual valve 53 is connected, via the D range oil path L3, to the C1 cut-off valve 55 and the input port of the C2 supply relay valve 59 acting as the third switching valve. In addition, the R range output port is connected to one of the input ports of the shuttle valve 63 on the supply oil path of the B2 brake hydraulic servo 85, and furthermore is connected to the release signal pressure port through the plunger edge receptor part of the primary regulator valve 52.

The supply path to the C1 clutch hydraulic servo 81 links to the supply path L31 via the input and output ports of the C1 cut-off valve 55 from the D range oil path L3, and is connected to the C1 clutch hydraulic servo 81 by a supply path L31' through the input and output ports of the C1 solenoid valve (SLC1), that acts as a first control means and operation means that regulates pressure on the basis of signals from the electronic control apparatus. The C1 solenoid valve 71 comprises a spool valve part that acts as a three port pressure-regulating valve to control the degree of communication of the drain port and the input and output ports by means of a spring-loaded spool, and as a three port linear solenoid valve part in which a solenoid load and a spring load are applied opposite each other similar to applying a solenoid pressure to the non-spring-loaded side edge of the spool. The input port of the linear solenoid valve part is connected to the output port of the solenoid modulator valve 54 via the modulator pressure oil path L6, and the output port of the linear solenoid valve part is connected to the signal pressure port of the spool valve part. In the spool valve part, the input port is connected to the output port of the C1 cut-off valve 55 via the supply path L31, the output port is connected to the C1 clutch hydraulic servo 81 via the supply path L31', and the feedback port leading to the spring-loaded side spool edge is connected to the oil path on the downstream side of the output port via an orifice. In this supply path, the oil path on the downstream side of the output port is further connected to the port of the different-diameter receptor part of the B1-C3 cut-off valve 56.

A supply path to the C2 clutch hydraulic servo 82 is connected from the D range oil path L3 to the supply path L32 via the input and output ports of the C2 supply relay valve 59 that acts as the third switching valve, and furthermore, is connected to the C2 clutch hydraulic servo 82 via the supply path L32' through the input and output ports of the C2 solenoid valve (SLC2) 72 that acts as a second control means and operating means for regulating pressure on the basis of a signal from the electronic control apparatus. The C2 solenoid valve 72 also comprises a spool valve part that acts as a three port pressure-regulating valve that controls the degree of communication of the drain port and the input and output ports by means of a spring-loaded spool, and a three port linear solenoid valve part in which a solenoid load and a spring load are applied opposite each other similar to applying a solenoid pressure to the non-spring-loaded side edge of the spool. Further, the input port of the linear solenoid valve part is connected to the output port of the solenoid modulator valve 54 via the modulator pressure oil path L6, and the output port of the linear solenoid part is connected to the signal pressure port of the spool valve part. In the spool valve part, the input port is connected to the output port of the C2 supply relay valve 59 via the supply path L32, the output port is connected to the C2 clutch hydraulic servo 82 via the supply path L32'. The feedback port leading to the spring-loaded side spool edge is connected to the oil path on the downstream side of the output port via an orifice. In this supply path, the oil path on the downstream side of the output port is further connected to the signal pressure ports on the spring-loaded side spool edge of the C1 cut-off valve 55, the B1-C3 cut-off valve 56 and the SLC3 release valve 60, and to the signal pressure port on the spool edge of the C2 supply relay valve 59 and the B2 cut-off valve 64.

A supply path to the C3 clutch hydraulic servo 83 leads from the line pressure oil path L1 along one of the two branches of the supply path L10 via the input and output ports of the B1-C3 cut-off valve 56 that acts as a first switching valve of the first group, leads along the supply path L11 through the input and output ports of the B1 apply relay valve 58, that acts as a second switching valve of the first group, and is connected to the C3 clutch hydraulic servo 83 by the supply path L11' via the input and output ports of the C3 solenoid valve (SLC3) 73 that acts as a third control means and operating means for regulating pressure on the basis of a signal from the electronic control apparatus. The C3 solenoid valve 73, in this case, also comprises a spool valve part that acts as a three port pressure-regulating valve that controls the degree of communication of the drain port and the input and output ports by means of a spring-loaded spool, and a three port linear solenoid valve part in which a solenoid load and a spring load are applied opposite each other similar to applying a solenoid pressure to the non-spring-loaded side edge of the spool. The input port of the linear solenoid valve part is connected to the output port of the solenoid modulator valve 54 via the modulator pressure oil path L6, and the output port of the linear solenoid valve part is connected to the signal pressure port of the spool valve part and is also connected to the spring-loaded side receptor part of the C3 apply relay valve 57 by the signal path L61 via the input and output ports of the SLC3 release valve 60. In the spool valve part, the input port is connected to the above-mentioned supply path L11, and the output port is connected to the C3 clutch hydraulic servo 83 via the supply path L11' and is connected to the port of the different-diameter receptor part of the B2 cut-off valve 64 and the C1 cut-off valve 55 through either the input port or output port of the shuttle valve 62.

The supply path to the B1 brake hydraulic servo 84, like the supply path to the above-mentioned C3 clutch hydraulic servo, leads from the line pressure oil path L1 along the other of the two branches of the supply path L10 via the input and output ports of the B1-C3 cut-off valve 56, that acts as a first switching valve of the second group and, in this case, leads along the supply path L12 through the input and output ports of the C3 apply relay valve 57, that acts as a second switching valve of the second group, and is connected to the B1 brake hydraulic servo 84 by the supply path L12' via the input and output ports of the B1 solenoid valve (SLB1) 74, that acts as a fourth control means and operating means for regulating pressure on the basis of a signal from the electronic control apparatus. The B1 solenoid valve 74 in this case also comprises a spool valve part that acts as a three port pressure-regulating valve that controls the degree of communication of the drain port and the input and output ports by means of a spring-loaded spool, and a three port linear solenoid valve part in which a solenoid load and a spring load are applied opposite each other similar to applying a solenoid pressure to the non-spring-loaded side edge of the spool. Furthermore, the input port of the linear solenoid part is connected to the output port of the solenoid modulator valve 54 via the modulator pressure oil path L6, and the output port of the linear solenoid part is connected to the signal pressure port of the spool valve part and is also connected to the spring-loaded side receptor part of the B1 apply relay valve 58 by the signal path L62 via the input and output ports of the SLB1 release valve 61. In the spool valve part, the input port is connected to the abovementioned supply path L12, and the output port is connected to the B1 brake hydraulic servo 84 via the supply path L12' and is connected to the port of the different-diameter receptor part of the B2 cut-off valve 64 and the C1 cut-off valve 55 through the other of the input port and output port of the shuttle valve 62.

The supply path to the B2 brake hydraulic servo 85, unlike the other supply paths, is the supply path of two systems. One of the supply paths is composed of an oil path connected to the R range oil path L4 via the shuttle valve 63, and the other of the supply paths is an oil path from the above-mentioned supply path L32 and is composed of an oil path that passes through the shuttle valve 63 and reaches the B2 brake hydraulic servo 85 by means of a supply path linking, in series, the C2 supply relay valve 59, the B2 cut-off valve 64 and the B2 control valve 65 on the supply path. In the supply path, the solenoid valve 75 for controlling the C2 supply relay valve 59 is a normally-closed three port on/off valve that opens and closes the input and output ports and the drain port by means of spring-loaded balls. Furthermore, the C2 supply relay valve 59 is a spring-loaded three port switching valve that switches the output port linked to the input port of the B2 cut-off valve 64 to the drain port and input port linked to the D range oil path L3 by means of one spool with a plunger action. In the plunger, a modulator pressure is applied on one end from the solenoid valve 75 and, on the other end, which abuts the spool, an apply pressure to the C2 clutch hydraulic servo 82 is applied.

The C1 cut-off valve 55 and C3 solenoid valve on the upstream side of the C1 solenoid valve 71, along with the B1-C3 cut-off valve 56 on the upstream side of the B1 solenoid valve, along with the SLC3 release valve 60 on the downstream side of the C3 solenoid valve, are all made to be the exact same spool-type three port switching valves having an input and output ports and a drain port. They all have a configuration comprising a two-level different-diameter receptor part as the diameter of the spring-loaded edge part is shrunk. The signal pressure port leading to the non-spring-loaded side spool edge of each of these valves 55, 56, 60 are all connected to the line pressure oil path L1 as described above. Further, the signal pressure port leading to the different-diameter receptor part of the C1 cut-off valve 55 is connected via an orifice to the signal pressure port of the different-diameter receptor part of the B2 cut-off valve 64 and the output port of the shuttle valve 62, and the signal pressure port leading to the receptor part on the spring-loaded side spool edge is connected via an orifice to the supply path L32' of the C2 clutch hydraulic servo 82. In addition, the signal pressure port leading to the different-diameter receptor part of the B1-C3 cut-off valve 56 is connected via an orifice to the supply path L31' of the C1 clutch hydraulic servo 81, and the signal port leading to the receptor part on the spring-loaded side spool edge is connected via an orifice to the C2 clutch hydraulic servo 82. In addition, the signal pressure port leading to the different-diameter receptor part of the SLC3 release valve 60 is connected via an orifice to the supply path L12' of the B1 brake hydraulic servo 84, and the signal port leading to the receptor part on the spring-loaded side spool edge is connected to the supply path L32' of the C2 clutch hydraulic servo 82 via an orifice.

The C3 apply relay valve 57 and the B1 apply relay valve 58 on the downstream side of the B1-C3 cut-off valve 56, along with the SLB1 release valve 61 on the downstream side of the B1 solenoid valve 74, are all made to be the exact same spool-type three port switching valves having an input port, an output port, and a drain port. The valves 57, 58, 61 have a configuration in which there is no difference in diameter in the spool. The signal pressure port leading to the non-spring-loaded side spool edge of each of the valves 57, 58, 61 are all connected to the modulator pressure oil path L6. Furthermore, the signal pressure port leading to the receptor part on the spring-loaded side spool edge of the C3 apply relay valve 57 is connected to the output port of the SLC3 release valve 60 via an orifice. In addition, the signal pressure port leading to the receptor part on the spring-loaded side spool edge of the B1 apply relay valve 58 is connected to the output port of the SLB1 release valve 61 via an orifice. In addition, the signal pressure port leading to the receptor part on the spring-loaded side spool edge of the SLB1 release valve 61 is connected to the output port of the SLC3 release valve 60 via an orifice.

The C2 supply relay valve 59, on the upstream side of the C2 solenoid valve 72, is used as a spool-type three port switching valve having an input port, an output port, and a drain port. On the side opposite the spring-loaded edge part of the spool, a plunger abuts the spool. The valve 59 is such that the port leading to the receptor part between the spool and the plunger is connected to the supply path L32' of the C2 clutch hydraulic servo 82, and the port leading to the receptor part on the plunger edge is connected to the output port of the on/off solenoid valve 75.

The B2 cut-off valve 64 is made to be a spool-type three port switching valve having an input port, an output port, and a drain port. It has a configuration comprising a two-level different-diameter receptor part as the diameter of the non-spring-loaded edge part is shrunk. The port of the valve 64 leading to the spool edge receptor part is connected via an orifice to the supply path L32' of the C2 clutch hydraulic servo 82, and the port leading to the different-diameter receptor part is connected via an orifice to the output port of the shuttle valve 62. The output port of the B2 cut-off valve 64 is connected to the input port of the B2 control valve 65 through a circuit, the diagram for the detailed structure in between which is omitted. In addition, the B2 control valve 65 is made to be a spool-type three port switching valve having an input port, an output port, and a drain port. The output port is connected to one of the input ports of the shuttle valve 63, while the port leading to the spool edge on the non-input pressure load side is connected to the throttle pressure oil path L7 via an orifice.

With the hydraulic circuit having the above-described structure, in the "N" position of the manual valve 53, the input port linking to the line pressure oil path L1 is closed and all of the output ports are drained. Consequently, the modulator pressure regulated by the solenoid modulator valve 54, directly linked to the line pressure oil path L1, is output to the modulator oil path L6, but each of the solenoid valves 71–74 are signal ON and the solenoid valve 75 is signal OFF. Moreover the input ports of the solenoid valves 71, 72 are in a drain state so hydraulic pressure cannot be supplied, and the solenoid valve 75 is in a state with the input port and output port thereof cut-off. Consequently, output of apply pressure from the solenoid valves 71, 72 and application of the solenoid pressure from the solenoid valve 75 do not occur.

In addition, line pressure is applied to the spool edge signal pressure port of the valves 55, 56, 60 connected to the line pressure oil path L1. Hence, the valves 55, 56, 60 are switched to the upper position in the diagram in opposition to the spring force, and, in addition, each of the valves 57, 58, 61 are switched to the upper position in the diagram by the application of modulator pressure from the modulator oil path L6. Accordingly, hydraulic pressure is supplied to the supply path L10 from the B1-C3 cut off valve 56. That hydraulic pressure passes through to the input ports of the solenoid valve 73 and the solenoid valve 74 via the C3 apply relay valve 57 and the B1 apply relay valve 58, but solenoid pressure is not applied to the spool valve parts of these valves and, hence, an output of apply pressure to the hydraulic servos 83, 84, corresponding to these solenoid valve 73, 74, and an output of solenoid pressure to the signal paths L61, L62 does not occur. The communication relationship is the same in the "P" position of the manual valve 53, although the spool positions differ.

When the manual valve 53 is switched to the "D" position, line pressure is also output to the D range oil path L3, so the hydraulic pressure of the D range oil path L3 is supplied to each of the input ports of the solenoid valve 71 and the C2 supply relay valve 59, excluding the C2 solenoid valve 72. That is, the hydraulic pressure of the D range oil path L3 via the C1 cut-off valve 55, which is in a communication state in the right side position in the diagram, is supplied to the input port of the C1 solenoid valve 71 on the oil path L3; the hydraulic pressure of the line pressure oil path L1 is supplied to the input port of the B1 solenoid valve 74 and the C3 solenoid valve 73 on the supply path L10, along the path in the above-described "N" position; and the hydraulic pressure of the D range oil path L3 is supplied to the input port of the C2 supply relay valve 59. For the oil path L32 to the input port of the C2 solenoid valve 72, solenoid pressure to the receptor part on the plunger edge of the C2 supply relay valve 59 is not applied because of the signal OFF of the solenoid valve 75, and hydraulic pressure from the oil path L32' to the part that abuts the spool is not applied either. Consequently, the valve 59 is drained by being in the position to the right side in the diagram under only the energizing force of the spring, and does not enter a state in which hydraulic pressure is supplied.

Next, the valve action during normal operation will be described. When the signal to the C1 solenoid valve 71 is set to OFF in order to attain the first speed, the line pressure of the D range oil path L3 which was supplied as far as the C1 solenoid valve 71 is regulated by the valve 71, becomes apply pressure, and is supplied from the supply path L31' to the C1 clutch hydraulic servo 81. Through this, the C1 clutch is engaged and works in cooperation with the one-way clutch F-1 so that the first speed is attained. At this time, the apply pressure to the C1 clutch is applied via an orifice to the different-diameter receptor part of the B1-C3 cut-off valve 56, but switching of the B1-C3 cut-off valve 56 does not occur due to the receptor relationship in the valve, so the above-mentioned hydraulic pressure supply relationship is maintained. In addition, the C2 supply relay valve 59 is positioned to the right side in the diagram, so the connection between the C2 solenoid valve 72 and the D range oil path L3 is mechanically cut off.

The second speed is attainted by setting the signal to the C1 solenoid valve 71 to OFF and the signal to the B1 solenoid valve 74 to OFF. In this state, the B1 solenoid valve 74 enters a regulated pressure state in addition to the apply pressure supply state to the above-mentioned C1 clutch hydraulic servo 81, and regulated apply pressure is supplied to the B1 brake hydraulic servo 84. Through this, the second speed is attained through engagement of the C1 clutch and the maintaining of the B1 brake reaction force. In this state, the apply pressure to the B1 brake is applied via an orifice to the different-diameter receptor part of the SLC3 release valve 60. Moreover, the apply pressure is applied to the different-diameter receptor part of the C1 cut-off valve 55 via the shuttle valve 62 but, because of the balance in pressures received, switching of the C1 cut-off valve 55 does not occur. In addition, at the same time the apply pressure to the B1 brake is applied to the different-diameter receptor part of the B2 cut-off valve 64, and switching of the B2 cut-off valve 64 to the position on the left side in the diagram occurs, so that the supply of hydraulic pressure to the B2 brake hydraulic servo 85 is mechanically cut off. Solenoid pressure is output from the B1 solenoid valve 74 to the signal path L62. The pressure is applied to the spring-loaded side receptor part of the B1 apply relay valve 58 via the SLC3 release valve 61 which is in a pass-through state and, because of the relationship of balance between the received pressure and the modulator pressure applied to the spool edge, the B1 apply relay valve 58 switches to the position on the left side in the diagram. Thus, the supply of hydraulic pressure from the supply path L10 to the C3 solenoid valve 73 is mechanically cut off.

The third speed is attained by setting the signals to the C1 solenoid valve and to the C3 solenoid valve 73 to OFF. In this case, the apply pressure supply state to the above-mentioned C1 clutch hydraulic servo 81 remains unchanged, while the C3 solenoid valve 73 enters a regulated pressure state, and the apply pressure of the C3 solenoid valve 73 is supplied to the C3 clutch hydraulic servo 83. In this manner, third speed is attained by simultaneous engagement of the C1 and C3 clutches. Further, the apply pressure to the C3 clutch hydraulic servo 83 is also applied to the different-diameter receptor part of the B2 cut-off valve 64 and the different-diameter receptor part of the C1 cut-off valve 55, in the same manner as in the above-mentioned second speed, via the shuttle valve 62, so the same state occurs as in the second speed. In addition, at the same time solenoid pressure is output to the signal path 61 from the C3 solenoid valve 73, and the pressure is applied to the spring-loaded side receptor part of the C3 apply relay valve 57 via the SLC3 release valve 60, which is in a pass-through state, and, because of the relationship of the balance between the received pressure and the modulator pressure applied to the spool edge, the C3 apply relay valve 57 switches to the position on the left side in the diagram. Thus, the supply of hydraulic pressure from the supply path L1 to the B1 solenoid valve 74 is mechanically cut off.

The fourth speed is attained by setting the signal to the C1 solenoid valve 71 to OFF, setting the signal to the C2 solenoid valve 72 to OFF, and setting the signal to the solenoid valve (SL1) 75 to ON. In this state, the apply pressure supply state to the C1 clutch hydraulic servo 81 remains unchanged, while the modulator pressure output by the solenoid valve 75 is applied to the plunger edge receptor part of the C2 supply relay valve 59. The valve 59 is pressed by the plunger and switches to the position to the left side in the drawing. Consequently, the hydraulic pressure of the D range oil path L3 is supplied to the C2 solenoid valve 72 by the oil path L32. Through this, the C2 solenoid valve 72 enters an apply pressure regulated pressure state, and the apply pressure is supplied to the C2 clutch hydraulic servo 82. The apply pressure, on the one hand, is applied to the receptor part of the spring-loaded edge side of the C1 cut-off valve 55 and, on the other hand, is applied to the spring-loaded side receptor part of the SLC3 release valve 60 and the spring-loaded edge receptor part of the B1-C3 cut-off valve 56. Moreover, the apply pressure is also applied to the receptor part between spools of the C2 supply relay valve 59. Through this, the B1-C3 cut-off valve 56, when the apply pressure rises as far as the line pressure, switches to the position on the left side in the diagram, and mechanically cuts off the connection between the D range oil path L3 and the B1 solenoid valve 74 with the C3 solenoid valve 73. In addition, the spool of the C2 supply relay valve 59, when the apply pressure to the C2 clutch hydraulic servo 82 becomes a set pressure lower than the line pressure, switches to the position on the left side in the diagram, and, when the pressure rises to the line pressure, maintains the position on the left side in the diagram. When the maintained state is established in this way, the ON signal of the solenoid valve 75 is unnecessary and is returned to OFF with the appropriate timing. That is to say, the signal to the solenoid valve 75 becomes ON only when changing speeds, and is turned OFF in the standing state after completion of the speed change. In this manner, fourth speed is attained by simultaneous engagement of the C1 and C2 clutches.

Fifth speed is attained by setting the signal to the C2 solenoid valve 72 to OFF, setting the signal to the C3 solenoid valve 73 to OFF and setting the signal to the solenoid valve 75 to ON. In this state, the apply pressure to the C2 clutch hydraulic servo 82 is similarly applied to the same valves as in the fourth speed, and the apply pressure to the C3 clutch hydraulic servo 83 is similarly applied to the same valves as in the third speed. From the combined application of hydraulic pressure, both apply pressures are applied to the spring-loaded side receptor part and the different-diameter receptor part of the C1 cut-off valve 55. When the hydraulic pressure rises as high as the line pressure, the C1 cut-off valve 55 switches to the position on the left side in the diagram, and mechanically cuts off the connection between the C1 solenoid valve 71 and the D range oil path 73. However, this action is unrelated to other valve actions. In addition, at the same time, solenoid pressure is output to the signal path 61 from the C3 solenoid valve 73, and is applied to the spring-loaded side receptor part of the C3 apply relay valve 57 via the SLC3 release valve 60 that is in a pass-through state. From the relationship of balance in pressure with the modulator pressure applied to the spool edge, the C3 apply relay valve 57 is switched to the position on the left side in the diagram, and the supply of hydraulic pressure from the supply path L10 to the B1 solenoid valve 74 is mechanically cut off. In this manner, fifth speed is attained through the simultaneous engagement of the C2 clutch and the C3 clutch.

Sixth speed is attained by setting the signal to the C2 solenoid valve 72 to OFF, setting the signal to the B1 solenoid valve 74 to OFF and setting the signal to the C2 supply relay control valve (SL1) 75 to ON. In this state, the action through the hydraulic pressure output from the valve 75 is the same as in the above-described fourth and fifth speeds. In addition, apply pressure to the B1 brake hydraulic servo 84 is similarly applied to the same valves as in second speed. In this case, both apply pressures are applied to the spring-loaded side receptor part and the different-diameter receptor part of the SLC3 release valve 60, and by these hydraulic pressures rising as far as the line pressure, the SLC3 release valve 60 switches to the position on the left side in the diagram and mechanically cuts off the connection between the C3 solenoid valve 73 and the C3 apply valve 57. Further, both apply pressures are also applied to the spring-loaded side receptor part and the different-diameter receptor part of the C1 cut-off valve 55. When the hydraulic pressures have risen as far as the line pressure, the C1 cut-off valve 55 switches to the position on the left side in the diagram, and mechanically cuts off the connection between the C1 solenoid valve 71 and the D range oil path L3. However, this action is unrelated to the other valve actions. Accordingly, sixth speed is attained by engagement of the C2 clutch and maintenance of the reaction force of the B1 brake.

In addition, reverse is attained by switching the manual valve 53 to the "R" position, and setting the signal to the C3 solenoid valve 73 to OFF. In this case, the D range oil path L3 is cut off, but line pressure is output to the R range oil path L4, and the hydraulic pressure is directly supplied to the B2 brake hydraulic servo 85 via the shuttle valve 63. Further, the line pressure of the line pressure oil path L1 is supplied to the input port of the B1-C3 cut-off valve 56, and the hydraulic pressure is supplied, by the normally applied line pressure to the B1 apply relay valve 58 via the B1-C3 cut-off valve 56, which is positioned to the right side in the diagram, to the C3 solenoid valve 73 via the valve 58, which is in a pass-through state, and is supplied to the C3 clutch hydraulic servo 83 from the C3 solenoid valve 73, which is in an apply pressure output state through the signal being OFF. Through this, reverse speed is attained by engagement of the C3 clutch and maintenance of the reaction force of the B2 brake.

Next, the actions during failure of the hydraulic control apparatus in a normal hydraulic pressure supply state, such as described above, will be explained. In this case, each of the normally-open solenoid valves 71–74 are all in an apply pressure supply state, and the normally-closed solenoid valve (C2 supply relay control valve) 75 is in a solenoid pressure cut-off state. Looking first at the state when the first speed is attained, the C2 solenoid valve 72 does not enter the apply pressure output state because the input port there is in a drain state via the C2 supply relay valve 59 (drain paths are shown by dashed lines in the diagram), but the other two solenoid valves, namely the C3 solenoid valve 73 and the B1 solenoid valve 74, are in an apply pressure output state. Through this, the attempt is made for the apply pressure of the C3 solenoid valve 73 to be supplied to the C3 clutch hydraulic servo 83, and the apply pressure of the B1 solenoid valve 74 to be supplied to the B1 brake hydraulic servo 84. However, the C3 apply relay valve 57 is such that the solenoid pressure output by the C3 solenoid valve 73 is applied to the spring-loaded side of the valve 57 via the SLC3 release valve 60. Thus, the valve 57 switches to the position on the left side in the diagram in opposition to application of the modulator pressure, the line pressure is cut off, and the B1 brake hydraulic servo 84 is switched to drain communication via the C3 apply relay valve 57. Similarly, solenoid pressure is also output from the B1 solenoid valve 74, but the solenoid pressure is cut off to the SLB1 release valve 61, which has been switched to the closed position through application, on the spring-loaded side receptor part, of a solenoid pressure from the C3 solenoid valve 73 applied via the SLC3 release valve 60, and does not reach the spring-loaded side receptor part of the B1 apply relay valve 58, so that switching of the valve 58 does not occur. The supply path to the B2 brake hydraulic servo 85 is cut off because the solenoid valve 75, which is normally closed, does not change with respect to its normal status, and because it is drained by the C2 supply release valve 59, an apply pressure supply state does not occur. Accordingly, during the first speed failure, upshifting occurs to the third speed attainment state with the C1 clutch and the C3 clutch simultaneously engaging.

When second speed has been attained, initially the C1 clutch hydraulic servo 81 and the B1 brake hydraulic servo 84 are in an apply pressure supply state under the action of the C1 solenoid valve 71 and the B1 solenoid valve 74, but when failure occurs, the C3 solenoid valve 73 attains an apply pressure supply state, excluding the C2 solenoid valve 72, that is mechanically cut off from the hydraulic pressure supply, and, as a result, the same hydraulic pressure state as in the first speed failure occurs. In this case, the solenoid pressure output from the C3 solenoid valve 73 is applied to the C3 apply relay valve 57 via the SLC3 release valve 60, while, due to the application of this solenoid pressure, the SLB1 release valve 61 is drained and the B1 apply relay valve 58 and B1 solenoid valve 74 are cut off. Accordingly, also during the second speed failure, upshifting occurs to the third speed attainment state with the C1 clutch and the C3 clutch simultaneously engaging.

Next, when the third speed has been attained, from the outset there is apply pressure to the C3 clutch hydraulic servo 83. Consequently the C3 apply relay valve 58 is in a drain communication state with apply pressure cut-off to the B1 brake hydraulic servo 84 positioned to the left side in the diagram. Hence, even during a failure, no change occurs relative to the normal hydraulic pressure supply. Accordingly, during the third speed failure, the C1 and C3 clutches remain in a simultaneously engaged state, and the third speed attainment state is maintained.

Next, when the fourth speed has been attained, initially there is an apply pressure state to the C1 clutch hydraulic servo 81 and the C2 clutch hydraulic servo 82. The input ports for the valves other two servos 83, 84, namely the C3 solenoid valve 73 and the B1 solenoid valve 74 are in a drain communication state with the supply path L10 cut off by the B1-C3 cut-off valve 56, so even if both of these valves are set to signal OFF by a failure, output of the apply pressure does not occur. In addition, if a signal to the solenoid valve 75 is set to OFF by a failure, because the signal to the valve 75 is normally in an OFF state as discussed above, there is no effect on the action of the C2 supply relay valve 59. That is to say, in this circuit, the spool of the C2 supply relay valve 59 is self-maintained in the position of the left side in the diagram by the apply pressure to the C2 clutch hydraulic servo 82. Consequently, the supply of apply pressure from the C2 solenoid valve 72 to the C2 clutch hydraulic servo 82 is maintained without impediment. Accordingly, during the fourth speed failure, the apply pressure supply state to the C1 clutch hydraulic servo 81 and the C2 clutch hydraulic servo 82 is maintained without change from the outset, so the fourth speed attainment state is maintained.

Next, when the fifth speed has been attained, initially the C2 clutch hydraulic servo 82 and the C3 clutch hydraulic servo 83 are in a state with apply pressure supplied, and the supply of hydraulic pressure to the C1 solenoid valve 71 is mechanically cut off by overlapping application of the C3 clutch apply pressure and the C2 clutch apply pressure to the C1 cut-off valve 55, so even if the C1 solenoid valve 71 is in a control state due to a signal OFF caused by a failure, apply pressure is not supplied to the C1 clutch hydraulic servo 81. Similarly, the supply path to the B1 brake hydraulic servo 84 is cut off by the C3 apply relay valve 57 to which the solenoid pressure of the C3 solenoid valve 73 is applied. Consequently, even if the B1 solenoid valve 74 is in a control state due to a signal OFF caused by a failure, apply pressure is not supplied to the B1 brake hydraulic servo 84.

In addition, the solenoid pressure is cut off by the SLB1 release valve 61 and does not reach the B1 apply relay valve 58. The state of the C2 supply relay valve 59 caused by a signal OFF to the solenoid valve 75 at this time is the same as in the fourth speed failure case. Accordingly, even during this fifth speed failure, no change occurs in the engagement status of the C2 clutch and the C3 clutch, and the fifth speed attainment state is maintained.

Next, when sixth speed has been attained, initially the C2 clutch hydraulic servo and the B1 brake hydraulic servo 84 are in a state with apply pressure supplied. Through this, the supply path L31 to the C1 solenoid valve 71 is cut off by the C1 cut-off valve 55 for the same reason as in the fifth speed case. Consequently, even if the C1 solenoid valve 71 is in a control state due to a signal OFF caused by a failure, apply pressure is not supplied to the C1 clutch hydraulic servo 81. In addition, the supply path from the C3 solenoid valve 73 to the C3 clutch hydraulic servo 83 is cut off by the B1 apply relay valve 58, which is in a position to the left side in the diagram with solenoid pressure output by the B1 solenoid valve 74 applied via the SLB1 release valve 61, so that even if the C3 solenoid valve 73 is in a control state due to a signal OFF caused by a failure, apply pressure is not supplied to the C3 clutch hydraulic servo 83. In addition, the hydraulic pressure supply to the B1 brake hydraulic servo 84 is cut off by the SLC3 release valve 60, which is in a position to the left side in the diagram with the solenoid pressure output by the C3 solenoid valve 73 overlappingly applied with the C2 clutch apply pressure and the B1 brake apply pressure, so the pressure does not reach the C3 apply relay valve 57, and the valve continues with the open state maintained. The state of the C2 supply relay valve 59 caused by a signal OFF to the solenoid valve 75 at this time is the same as in the fourth speed failure case. Accordingly, during the sixth speed failure, engagement of the C2 clutch and the B1 brake is maintained, and the sixth speed attainment state is maintained.

When reverse speed has been attained, the line pressure supply itself to the D range oil path L3 from the manual valve 53 disappears. Consequently, only the hydraulic pressure supply to the B1 brake hydraulic servo 84, which is supplied from the line pressure oil path L1, becomes a problem, but the C3 apply relay valve 57 of the supply path is cut off due to the application of solenoid pressure output by the C3 solenoid valve 73. Consequently, even if the B1 solenoid valve 74 is in a control state, the apply pressure is not supplied. In addition, solenoid pressure output by the B1 solenoid valve 74 through modulator pressure is cut off by the SLB1 release valve 61 on which solenoid pressure output by the C3 solenoid valve 73 is applied, so there is no effect on the action of the B1 apply relay valve 58. Accordingly, in this case, reverse speed is maintained without regard to failures in each solenoid valve.

Furthermore, in this circuit composition, when a switch to the "D" position is made after restarting, by means of a signal OFF of the solenoid valve 75, a state is achieved in which apply pressure is output from all three solenoid valves 71, 73, 74, excluding the C2 solenoid valve 72, which is cut off from communication to the D range oil path L3 by the C2 supply relay valve 59. However, even in this case, the same oil path connections occur as in the above-described failure state during the second speed, and the line pressure supply to the B1 solenoid valve 74 is cut off by the C3 apply relay valve 57 which is switched due to the solenoid pressure of the C3 solenoid valve, while the B1 brake hydraulic servo 84 achieves drain communication. Consequently, only the apply pressure supply to the C1 clutch hydraulic servo 81 and the C3 clutch hydraulic servo 83 are effective. Accordingly, in this case also, the third speed is attained through the simultaneous engagement of the C1 clutch and the C3 clutch, and movement and progress in this speed becomes possible.

FIG. 5 is a table comparing and contrasting the relationships among the hydraulic pressure supply of each hydraulic servo, the speeds and the action of each valve in the hydraulic control apparatus of the embodiment. As shown in the figure, in the first through third speeds, and in the restart case, the drain element that prevents engagement of the C2 clutch is the C2 supply relay valve, indicated by the reference number (5); the drain element that prevents engagement of the B2 brake in the second through sixth speeds, and in the restart case, is the B2 cut-off valve indicated by the reference number (6); the drain elements that prevent engagement of the B1 brake in the third and fifth speeds, and in the restart case, are the C3 apply relay valve indicated by the reference number (4) and the SLB1 release valve; the drain element that prevents engagement of the C3 clutch and B1 brake in the fourth speed is the B1-C3 cut-off valve indicated by the reference number (2); the drain element that prevents engagement of the C1 clutch in the fifth and sixth speeds is the C1 cut-off valve indicated by the reference number (1); and the drain elements that prevent engagement of the C3 clutch in the sixth speed are the SLC3 release valve and the B1 apply release valve indicated by the reference number (3).

Figure 6:
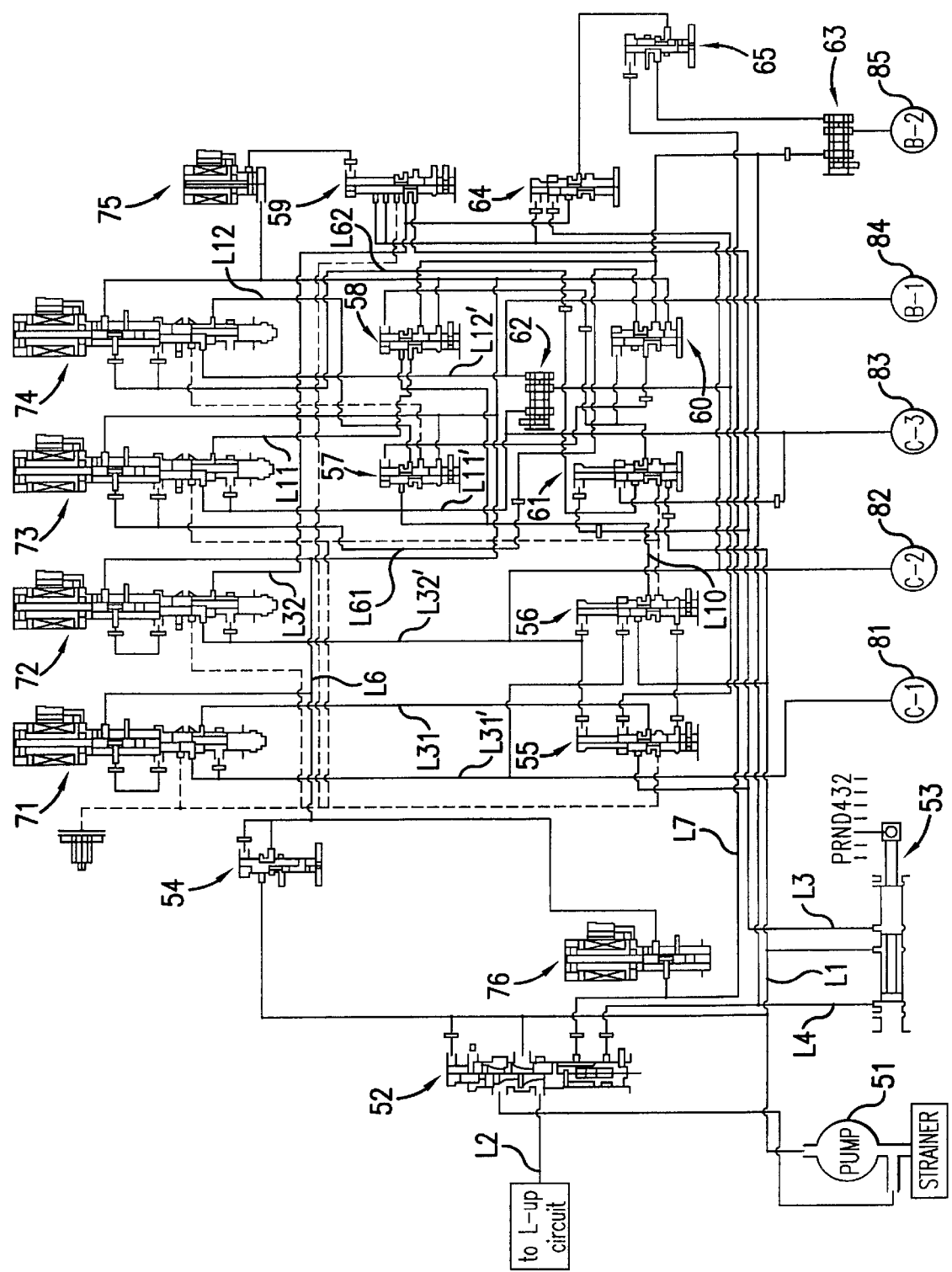
FIG. 6 is a circuit diagram of the hydraulic control apparatus of the second embodiment.

Next, FIGS. 6 and 7 show a second embodiment of the invention. As shown in FIG. 6, in this embodiment a portion of the oil path connections in the foregoing first embodiment are changed using the valves 55–62, 64, related to fail-safe, and fixation on the low speed side is expanded up to the second speed. The relationships of the oil path connections in this circuit are explained below, with emphasis on the points that have been changed. Valves and oil paths that are the same in this embodiment as in the foregoing embodiment are labeled with the same reference numbers, and an explanation of such is omitted here.

In this embodiment, with regard to the SLB1 release valve 61, the spring-loaded side receptor part is changed to connection to the D range oil path L3, the different-diameter receptor part is changed to connection to the supply path of the C3 clutch apply pressure, the input port is changed to connection to the signal path L62 of the solenoid path of the B1 solenoid valve 74, and the output port is changed to connection to the spring-loaded side receptor part of the B1 apply relay valve 58. In addition, with regard to the SLC3 release valve 60, the input port is changed to connection to the signal path L61 of the solenoid pressure of the C3 solenoid valve 73, the output port is changed to connection to the spring-loaded side receptor part of the C3 apply relay valve 57, and the port that acts as the drain port is changed to connection to the port that acts as the drain port of the B1 apply relay valve 58 and to the R range oil path L4.

The oil path connection relationships in attaining each speed in this embodiment differ from the above-described first embodiment only in the reverse range along with the second, third, fifth and sixth speeds of the D range in which solenoid pressure is output from the C3 solenoid valve 73 and the B1 solenoid valve 74. That is to say, in second speed and sixth speed, the solenoid pressure output from the B1 solenoid valve 74 is applied to the spring-loaded side receptor part of the B1 apply relay valve 58 via the SLB1 release valve 61 and, through this, the supply of line pressure to the C3 solenoid valve 73 is cut off. In addition, in third speed, fifth speed and the reverse range, the solenoid pressure output from the C3 solenoid valve 73 is applied to the spring-loaded side receptor part of the C3 apply relay valve 57 via the SLC3 release valve 60. Through this, the supply of line pressure to the B1 solenoid valve 74 is cut off.

Furthermore, from this cut-off relationship, during a failure state when the first speed has been attained, the solenoid pressure output by the B1 solenoid valve 74 is applied to the B1 apply relay valve 58 before the apply pressure to the C3 clutch hydraulic servo 83 can rise as far as the line pressure, and the supply of line pressure to the C3 solenoid valve 73 is cut off. Consequently, the SLC1 release valve 61 does not switch, application of solenoid pressure to the B1 apply relay valve 58 output from the B1 solenoid valve 74 through the release valve is continued, and only the supply of apply pressure to the C1 clutch hydraulic servo 81 and the B1 brake hydraulic servo 84 is effective. Accordingly, in this case the second speed is maintained by the C1 clutch and the B1 brake simultaneously engaging.

In addition, when second speed has been attained, even if solenoid pressure is output from the C3 solenoid valve 73, the solenoid pressure is not applied to the C3 apply relay valve 57 because of the cut-off state of the SLC3 release valve 60. Consequently, the supply of hydraulic pressure to the C1 clutch hydraulic servo 81 and the B1 brake hydraulic servo 84 is maintained and the second speed is maintained.

The relationship of initial speeds and speeds after failures when the other speeds are attained are the same as in the case of the above-described first embodiment, so an explanation will be omitted for FIG. 7, which shows in table format a comparison and contrasts the action of each valve, the speeds and the supply state of hydraulic pressure to the hydraulic servos in the hydraulic control apparatus.

In this circuit composition, when a switch to the "D" position is made after restarting, by means of a signal OFF of the solenoid valve 75, a state is achieved in which apply pressure is output from all three solenoid valves 71, 73, 74, excluding the C2 solenoid valve 72 which is cut off from the link to the D range oil path L3 by the C2 supply relay valve 60A. In this case, when restarting in the N and P ranges, apply pressure is output from the solenoid valves 73, 74 connected to the line pressure oil path L1 and, along with this, the SLB1 release valve 61 switches to the position on the right side in the diagram in opposition to the spring load through line pressure from the line pressure oil path connected to the SLB1 release valve 61. Accordingly, solenoid pressure output by the B1 solenoid valve 74 is applied to the B1 apply relay valve 58 before the apply pressure to the C3 clutch hydraulic servo 83 rises to the line pressure. As a result, the link between the C3 clutch hydraulic servo 83 and the solenoid valve 73 is mechanically cut off. Thus, when the switch to the "D" position is accomplished following this, even if the D range pressure is applied to the spring-loaded side receptor part of the SLB1 release valve 61, the apply pressure of the C3 clutch is not applied to the different-diameter receptor part, so the position of the SLB1 release valve 61 is maintained in the position to the right side in the diagram. Hence, only the apply pressure to the C1 clutch hydraulic servo 81 and the B1 brake hydraulic servo 84 is effective. Accordingly, in this case also, the second speed is maintained through the simultaneous engagement of the C1 clutch and the B1 brake, and movement and progress using the second speed are possible.

The relationships among the hydraulic pressure supply of each hydraulic servo, the speeds, and the action of each valve in the hydraulic control apparatus of the second embodiment are as shown in FIG. 7. As shown in FIG. 7, in the first through third speeds, and in the restart case, the drain element that prevents engagement of the C2 clutch is the C2 supply relay valve indicated by the reference number (5); the drain element that prevents engagement of the B2 brake in the second through sixth speeds and in the restart case is the C2 cut-off valve indicated by the reference number (6); the drain elements that prevent engagement of the B1 brake in the third and fifth speeds are the C3 apply relay valve indicated by the reference number (4) and the SLB1 release valve; the drain element that prevents engagement of the C3 clutch and B1 brake in the fourth speed is the B1-C3 cut-off valve indicated by the reference number (2); the drain element that prevents engagement of the C1 clutch in the fifth and sixth speeds is the C1 cut-off valve indicated by the reference number (1); and the drain elements that prevent engagement of the C3 clutch in the second and sixth speeds and in the restart case are the SLC3 release valve and the B1 apply release valve indicated by the reference number (3).

Figure 8:
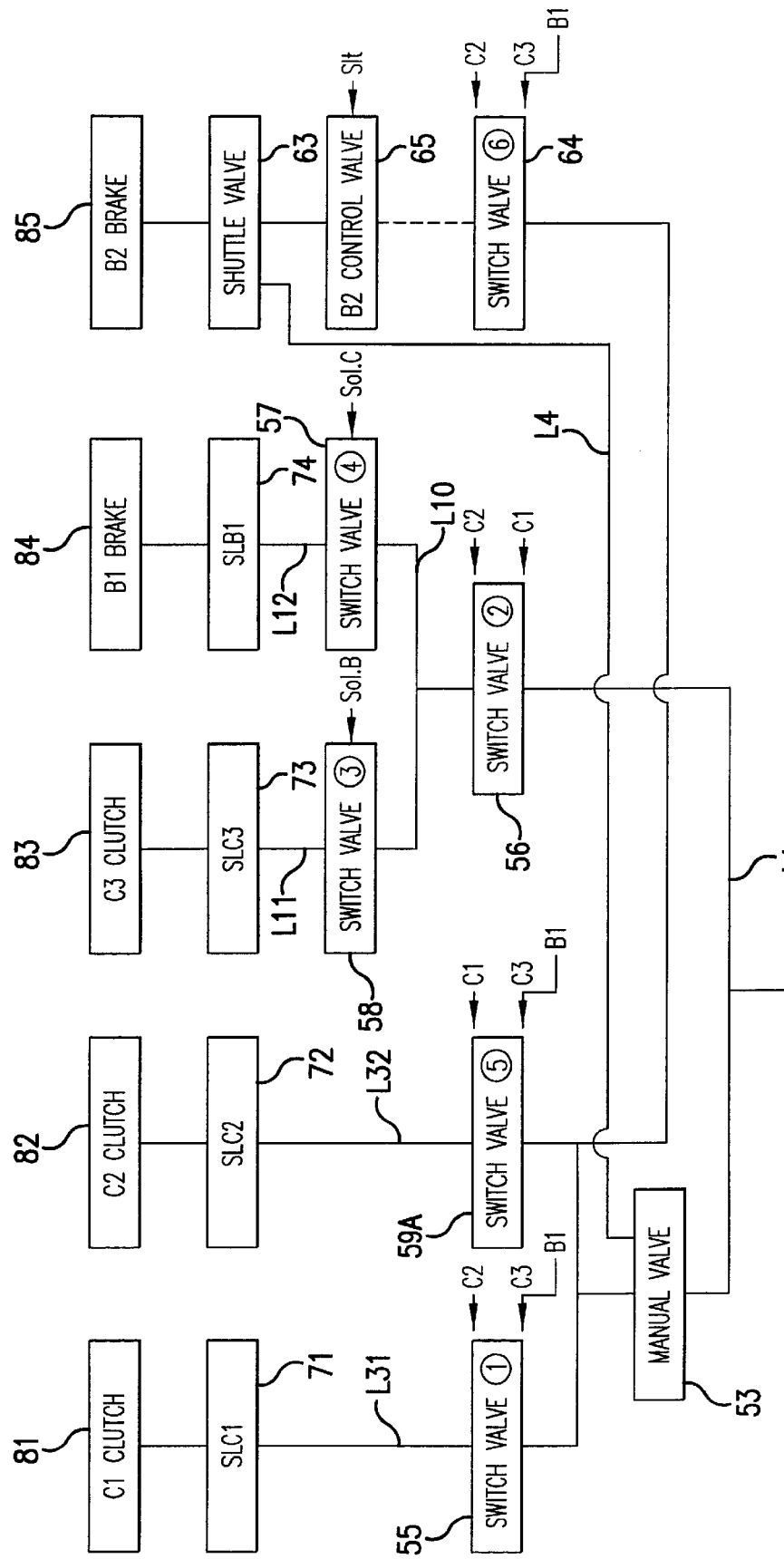
FIG. 8 is a summary circuit diagram of the hydraulic control apparatus of the third embodiment.
Figure 9:
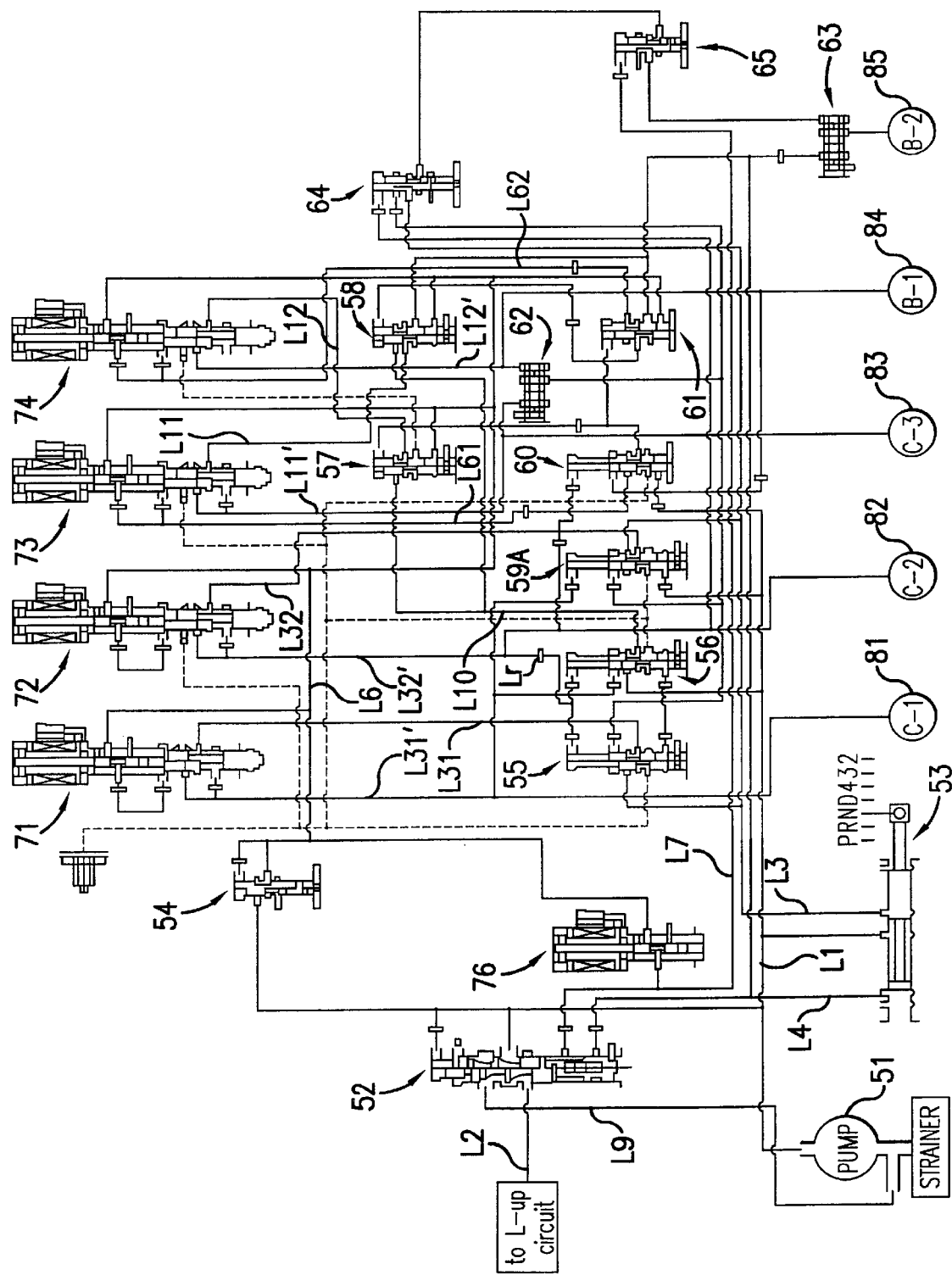
FIG. 9 is a circuit diagram of the hydraulic control apparatus of the third embodiment.

Next, FIGS. 8 through 10 show a third embodiment of the invention. As shown in the circuit structures in FIGS. 8 and 9, in the third embodiment, of the valves 55–61, 64 related to fail-safe in the above-described first embodiment, the C2 supply relay valve 59, which is in the form of a relay valve on the supply path 32 of the C2 clutch hydraulic servo 82, that is, in a closed state when no signal pressure is applied, is changed to a cut-off form like the other valves, that is to say is changed to the cut-off valve 59A. Accompanying this, application of signal pressure to the valve 59A changes. The circuit is explained below with emphasis on the points of change. Valves and oil paths that are the same in this embodiment as in the foregoing embodiments are labeled with the same reference numbers, and an explanation of such is omitted.

The C2 cut-off valve 59A, that serves as the third switching valve in this embodiment, has the same form as the other cut-off valves 55, 56, 60. The connection relationship between the input and output ports and the supply paths are the same as in the case of the C2 supply relay valve 59 of the foregoing embodiments. The signal pressure port linked to the spool edge receptor part of the C2 cut-off valve 59A is connected to the line pressure oil path L1, the signal pressure port linked to the spring-loaded side receptor part is connected to the supply path L31' of the C1 clutch hydraulic servo 81, and the signal pressure port linked to the different-diameter receptor part is connected to the output port of the shuttle valve 62. Accordingly, the valve 59A is normally in a communicating state between the input and output ports by the application of a line pressure opposing the spring load, the apply pressure of the clutch C1 applied to the spring-loaded side receptor part overlaps with either the apply pressure of the C3 clutch applied to the different-diameter receptor part or the apply pressure of the B1 brake, and the valve switches, when both apply pressures have risen to the line pressure, causing a cut-off state between the input and output ports. Further, as an applying mechanism, the switching order of the C2 cut-off valve 59A and the B1-C3 cut-off valve 56 should be set appropriate to the action during failures, so an orifice Lr is provided as a delay means in the middle of the signal path reaching from the supply path L32' to the spring-loaded side receptor part of the B1-C3 cut-off valve 56.

Next, for the valve actions during normal operation, only the points of difference from the foregoing embodiments will be described. In the first speed, the apply pressure to the C1 clutch is applied via an orifice to the spring-loaded side receptor part of the C2 cut-off valve 59A, but from the pressure relationship in the valve 59A, switching does not occur even if the apply pressure rises to the line pressure, and so the valve is in the communicating state, but the C2 solenoid valve 72 does not supply hydraulic pressure to the C2 hydraulic servo 82 because of a signal ON state.

In the second speed, the C1 solenoid valve 71 and the B1 solenoid valve 74 enter a regulated pressure state, and the apply pressure to the C1 clutch is applied to the spring-loaded side receptor part of the C2 cut-off valve 59A, while the apply pressure of the B1 brake is applied to the different-diameter receptor part of the valve 59A via the shuttle valve 62. Consequently, when both of these apply pressures rise as far as the line pressure, the C2 cut-off valve 59A switches to a cut-off state between the input and output ports in opposition to the application of apply pressure to the spool edge receptor part, and the supply path L32 is mechanically cut off.

In the third speed, the C1 solenoid valve 71 and the C3 solenoid valve 73 enter a regulated pressure state, and in the C2 cut-off valve 59A, the apply pressure to the C1 clutch is applied to the spring-loaded side receptor part, and the apply pressure of the C3 clutch is applied via the shuttle valve 62 to the different-diameter receptor part. Consequently, the same as in the case of the second speed, when these two apply pressures rise as far as the line pressure, the C2 cut-off valve 59A switches to a cut-off state between the input and output ports in opposition to the application of apply pressure to the spool edge receptor part, and the supply path L32 is mechanically cut off.

In the fourth speed, in the C2 cut-off valve 59A, the apply pressure to the C1 clutch through the regulated pressure of the C1 solenoid valve 71 is applied to the spring-loaded side receptor part but, from the pressure relationship of this valve, the communicating state between the input and output ports is maintained. Accordingly, apply pressure is supplied to the C2 clutch hydraulic servo 82 through the regulated pressure of the solenoid valve 72 obtained by the hydraulic pressure supply.

In the fifth speed, in the C2 cut-off valve 59A, the apply pressure to the C3 clutch through the regulated pressure of the C3 solenoid valve 73 is applied to the different-diameter receptor part via the shuttle valve 62, but from the pressure relationship of the valve 59A, the communicating state between the input and output ports is maintained. Accordingly, apply pressure is supplied to the C2 clutch hydraulic servo 82 through the regulated pressure of the solenoid valve 72 obtained by the hydraulic pressure supply.

In the sixth speed, in the C2 cut-off valve 59A, the apply pressure to the B1 brake through the regulated pressure of the B1 solenoid valve 74 is applied to the different-diameter receptor part via the shuttle valve 62, but from the pressure relationship of the valve 59A, the communication state between the input and output ports is maintained. Accordingly, apply pressure is supplied to the C2 clutch hydraulic servo 82 through the regulated pressure of the solenoid valve 72 obtained by the hydraulic pressure supply.

In addition, in reverse, in the C2 cut-off valve 59A, the apply pressure to the C3 clutch through the regulated pressure of the C3 solenoid valve 73 is applied to the different-diameter receptor part via the shuttle valve 62, but the supply of D range pressure itself is cut off through switching of the manual valve 53, so hydraulic pressure is not supplied to the supply path L32.

Next, the action during failures is described. In the case of failure, all of the solenoid valves 71–74 are in an apply pressure supply state without regard to the speed that has been attained. Looking at this state for the first speed in which the C1 solenoid valve alone is initially in a regulated pressure state, the apply pressure supply to the B1 brake hydraulic servo 84 is promptly cut-off by the switching of each valve through solenoid pressure, as described in detail in the case of the first speed failure of the foregoing embodiments, through the apply pressure output state from the C2 solenoid valve 72, the C3 solenoid valve 73 and the B1 solenoid valve 74, so that the apply pressure supply to the C3 clutch hydraulic servo 83 is effective. Accordingly, the C2 cut-off valve 59A, which is switched due to overlapping application of the apply pressure of the C1 clutch (which is line pressure from the outset) and the apply pressure of the C3 clutch (which rises from the time the failure occurs), is initially in a communicating state, and hydraulic pressure is output to the C2 clutch hydraulic servo 82 from the C2 solenoid valve which enters a regulated pressure state. Through these states, the signal pressure applied to the spring-loaded side receptor part of the B1-C3 cut-off valve 56 is delayed with respect to the rising pressure of the supply path L32' due to the action of the orifice Lr, and consequently raising of the apply pressure of the C3 clutch applied to the different-diameter receptor part of the C2 cut-off valve 59A, via the shuttle valve 62, occurs first, so the C2 cut-off valve 59A switches before the B1-C3 cut-off valve 56 can switch, and its own supply path L32 is mechanically cut off. As a result, the hydraulic pressure output to the C2 clutch hydraulic servo 82 is drained before the C2 clutch reaches engagement, while the hydraulic pressure supply via the B1-C3 cut-off valve 56 is maintained. The supply path on the D range oil path side to the B2 brake hydraulic servo 85 is drained by the B2 control valve 65 and, hence, does not achieve the apply pressure supply state. Accordingly, during failures in the first speed, upshifting occurs to a third speed state wherein the C1 clutch and C3 clutch are simultaneously engaged, the same as in the foregoing first embodiment.

When second speed has been attained, the C1 clutch hydraulic servo 81 and the B1 brake hydraulic servo 84 are in an apply pressure (line pressure) supply state due to the action of the C1 solenoid valve 71 and the B1 solenoid valve 75 from the outset. Consequently, the C2 cut-off valve 59A is cut off by the overlapping application of both of the hydraulic pressures. Midway through this, the apply pressure of the B1 brake is switched to the apply pressure of the C3 clutch, but the control state of the C2 solenoid valve in which the hydraulic pressure supply is mechanically cut off is unrelated to the hydraulic pressure output. During failures in the second speed, also, upshifting occurs to a third speed state wherein the C1 clutch and C3 clutch are simultaneously engaged, the same as in case of the first embodiment.

When the third speed has been attained, there is apply pressure to the C1 clutch hydraulic servo 81 and the C3 clutch hydraulic servo 83 from the outset. Consequently, no change occurs in the status of the C2 cut-off valve 59A. Also, during failures in the third speed, the simultaneous engagement of the C1 clutch and the C3 clutch is maintained and the third speed attainment status is maintained, the same as in the case of the first embodiment.

Next, when the fourth speed has been attained, initially there is an apply pressure supply state to the C1 clutch hydraulic servo 81 and the C2 clutch hydraulic servo 82, and the hydraulic pressure supply of the other two valves, namely the C3 solenoid valve 73 and the B1 solenoid valve 74 is severed by the B1-C3 cut-off valve 56. Consequently, output of apply pressure from these two valves does not occur, so no change occurs in the status of the C2 cut-off valve 59A. Accordingly, during failures in the fourth speed, the apply pressure supply state to the C1 clutch hydraulic servo 81 and the C2 clutch hydraulic servo 82 is maintained, and the fourth speed attainment status is maintained, the same as in the case of the first embodiment.

When the fifth speed has been attained, the status of the C2 cut-off valve 59A is the same as in the case of failures in the fourth speed. Accordingly, during failures in the fifth speed, no change occurs in the engagement status of the C2 clutch and the C3 clutch, so the fifth speed attainment status is maintained, the same as in the case of the first embodiment.

When sixth speed has been attained, the status of the C2 cut-off valve 59A is the same as in the case of failures in the fourth speed. Accordingly, during failures in the sixth speed, no change occurs in the engagement status of the C2 clutch and the B1 brake, so the sixth speed attainment status is maintained, the same as in the case of the first embodiment.

When reverse has been attained, reverse speed is maintained without regard to failures in each of the solenoid valves, the same as in the case of the first embodiment, without regard to the status of the cut-off valve 59A.

Furthermore, in this circuit structure, when the switch to the "D" position is made after a restart, each of the solenoid valves 71–74 is in an apply pressure supply state. Accordingly, the apply pressure supply to the B1 brake hydraulic servo 84 is promptly cut-off by switching of each valve through solenoid pressure, as described in detail in the case of the first speed failure of the foregoing embodiments, through an apply pressure output state from the C2 solenoid valve 72, the C3 solenoid valve 73 and the B1 solenoid valve 74, so that the apply pressure supply to the C3 clutch hydraulic servo 83 is effective. Accordingly, the C2 cut-off valve 59A, which is switched due to overlapping application of the apply pressure of the C1 clutch (which is line pressure from the outset) and the apply pressure of the C3 clutch (which rises from the time the failure occurs), is initially in a communicating state, and hydraulic pressure is output to the C2 clutch hydraulic servo 82 from the C2 solenoid valve which enters a regulated pressure state. Through this, the signal pressure applied to the spring-loaded side receptor part of the B1-C3 cut-off valve 56 and the C1 cut-off valve 55 is delayed with respect to the rising pressure of the supply path L32' due to the action of the orifice Lr. Consequently, the apply pressure of the C3 clutch applied to the different-diameter receptor part of the C2 cut-off valve 59A via the shuttle valve 62, and the apply pressure of the C1 clutch applied to the spring-loaded side receptor part of the C2 cut-off valve 59A, rise first, so the C2 cut-off valve 59A switches before the B1-C3 cut-off valve 56 and the C1 cut-off valve 55 can switch, and its own supply path L32 is mechanically cut off. Hence, the hydraulic pressure output to the C2 clutch hydraulic servo 82 is drained before the C2 clutch reaches engagement, while the hydraulic pressure supply via the B1-C3 cut-off valve 56 and the C1 cut-off valve 5 is also maintained. The supply path on the D range oil path side to the B2 brake hydraulic servo 85 is drained by the B2 control valve 65, and hence does not achieve the apply pressure supply state. Accordingly, the same oil path connections occur as in the above-described failures in second speed, so third speed is attained through simultaneous engagement of the C1 clutch and the C3 clutch, and movement and progress are possible using this speed.

FIG. 10 is a table comparing and contrasting the relationships among the hydraulic pressure supply of each hydraulic servo, the speeds and the action of each valve in the hydraulic control apparatus of the third embodiment. In this case, as shown in the figure, the drain element that prevents engagement of the C2 clutch in the first through third speeds and in the restart case is switched from the C2 supply relay valve 59 of the first embodiment to the C2 cut-off valve 59A as indicated by the reference number (5), but the other drain elements are the same as in the case of the first embodiment.

Figure 11:
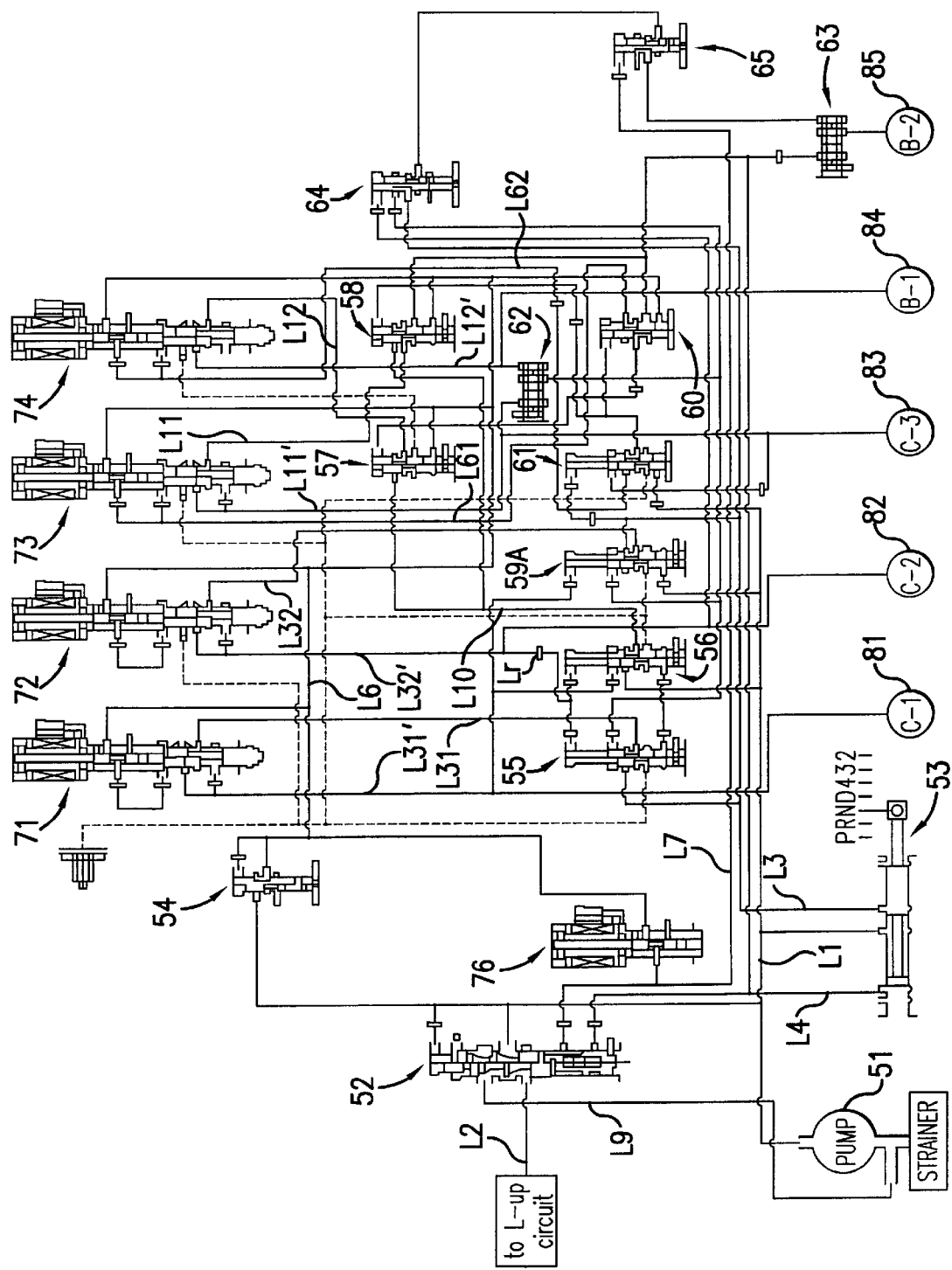
FIG. 11 is a circuit diagram of the hydraulic control apparatus of the fourth embodiment.

Next, FIGS. 11 and 12 show a fourth embodiment of the invention. As shown in the circuit structure in FIG. 11, in this embodiment only a portion of the oil path connections used in the each of the valves 55–61, 64 related to fail-safe in the third embodiment are changed, and fixing on the low speed side is enabled up to second speed as in the second embodiment. Accordingly, the changes in the oil path connections in this circuit and the differences in circuit operation caused by this are the same as the relationships of the second embodiment to the first embodiment. Thus, a description here will be omitted with reference to the explanation of changes in the second embodiment where they are the same. Valves and oil paths in this embodiment that are the same as in the foregoing third embodiment are also labeled with the same reference numbers, and an explanation of such is omitted here.

FIG. 12 is a table comparing and contrasting the relationships among the hydraulic pressure supply of each hydraulic servo, the speeds and the action of each valve in the hydraulic control apparatus of this embodiment. As shown in FIG. 12, in the first through third speeds and in the restart case, the drain element that prevents engagement of the C2 clutch is the C2 cut-off valve indicated by the reference number (5); the drain element that prevents engagement of the B2 brake in the second through sixth speeds and in the restart case is the B2 cut-off valve indicated by the reference number (6); the drain elements that prevent engagement of the B1 brake in the third and fifth speeds are the C3 apply relay valve indicated by the reference number (4) and the SLB1 release valve; the drain element that prevents engagement of the C3 clutch and B1 brake in the fourth speed is the B1-C3 cut-off valve indicated by the reference number (2); the drain element that prevents engagement of the C1 clutch in the fifth and sixth speeds is the C1 cut-off valve indicated by the reference number (1); and the drain elements that prevent engagement of the C3 clutch in the second and sixth speeds and in the restart case are the SLC3 release valve and the B1 apply release valve indicated by the reference number (3).

Figure 13:
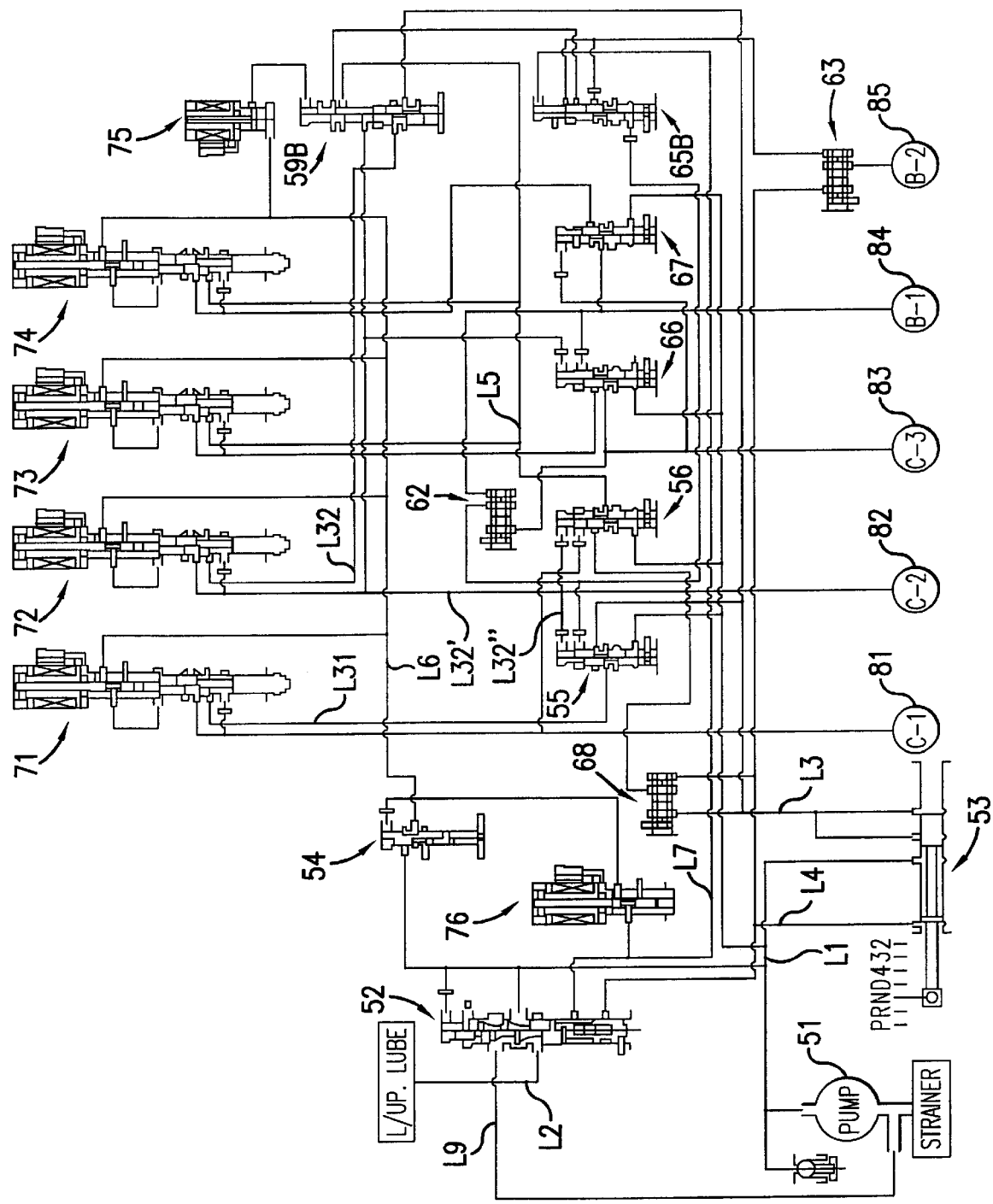
FIG. 13 is a circuit diagram of the hydraulic control apparatus of the fifth embodiment.
Figure 14:
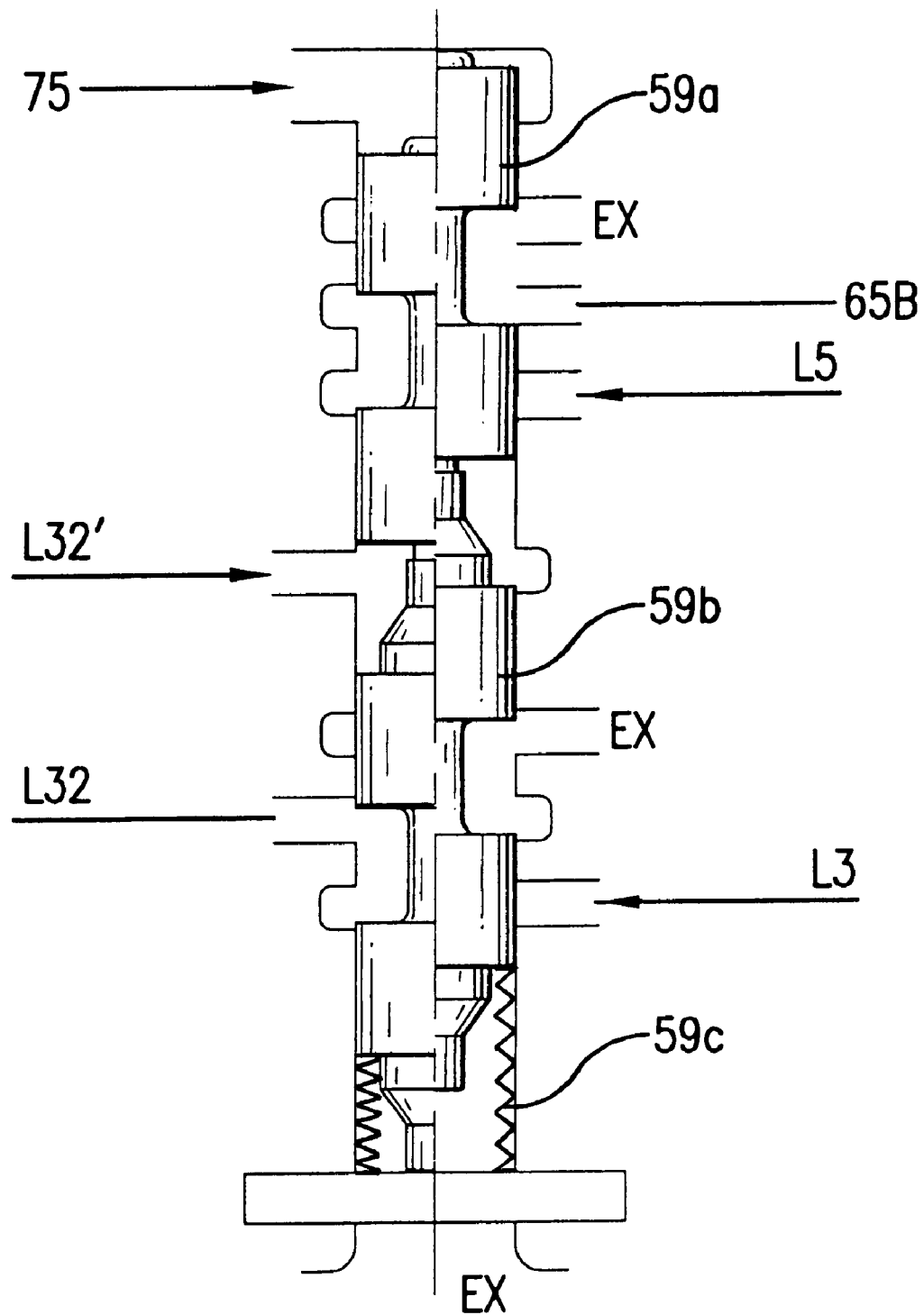
FIG. 14 is an enlargement of the C2-B2 supply relay valve of the hydraulic control apparatus of the fifth embodiment.
Figure 15:
FIG. 15 is a table comparing and contrasting the relationships among the hydraulic pressure supply and exhaust of each hydraulic servo, the speeds and the action of each valve in the hydraulic control apparatus of the fifth embodiment.

Next, FIGS. 13 through 15 show a fifth embodiment of the invention. As shown in the circuit structure of FIG. 13, the hydraulic pressure circuit primarily differs with respect to each of the foregoing embodiments in that the method is changed to one in which the supply paths of the C3 clutch and the B1 brake are cut off on the downstream side of the solenoid valves 73, 74. The relationships of each valve and oil path connection comprising this circuit are described below. In this embodiment, the respective compositions, functions and mutual connection relationships among the primary regulator valve 52, the manual valve 53 and the modulator valve 54 are the same as in each of the foregoing embodiments, so a description of such is omitted here.

Next, the supply path with respect to the C1 clutch hydraulic servo 81 has a structure such that the path is connected to the D range oil path L3 via the C1 release valve 55, and on the supply path on the downstream side from the C1 release valve 55, a C1 solenoid valve (SLC1) 71 is provided that acts to regulate the pressure on the basis of a signal from the electronic control apparatus. The C1 solenoid valve 71 comprises a spool valve part that acts as a three port pressure-regulating valve that controls the degree of communication of the drain port and the input and output ports by means of a spring-loaded spool, and a three port linear solenoid valve part in which a solenoid load and a spring load are applied opposite each other, similar to applying a solenoid pressure to the non-spring-loaded side edge of the spool. Furthermore, the input port of the linear solenoid valve part is connected to the output port of the solenoid modulator valve 54 via the modulator pressure oil path L6, and the output port of the linear solenoid valve part is connected to the signal pressure port of the spool valve part. In the spool valve part, the input port is connected to the output port of the C1 release valve 55, the output port is connected to the C1 clutch hydraulic servo 81 and the feedback port leading to the spool edge on the spring-loaded side is connected to the oil path on the downstream side of the output port via an orifice.

A supply path to the C2 clutch hydraulic servo 82 is connected to the D range oil path L3 via the C2-B2 supply relay valve 59B. A C2 solenoid valve (SLC2) 72 that acts to regulate the pressure on the basis of signals from the electronic control apparatus is provided on the supply path on the downstream side of the C2-B2 supply relay valve 59B. The C2 solenoid valve 72 also comprises a spool valve part that acts as a three port pressure-regulating valve that controls the degree of communication of the drain port and the input and output ports by means of a spring-loaded spool, and a three port linear solenoid valve part in which a solenoid load and a spring load are applied opposite each other similar to applying a solenoid pressure to the non-spring-loaded side edge of the spool. Furthermore, the input port of the linear solenoid valve part is connected to the output port of the solenoid modulator valve 54 via the modulator pressure oil path L6, and the output port of the linear solenoid valve part is connected to the signal pressure port of the spool valve part. In the spool valve part, the input port is connected to the output port of the C2-B2 supply relay valve 59B via the supply path L32, the output port is connected to the C2 clutch hydraulic servo 82 and the feedback port leading to the spool edge on the spring-loaded side is connected to the oil path on the downstream side of the output port via an orifice. In this supply path, the oil path on the downstream side of the output port is further connected to the signal pressure port on the spool edge of the C2-B2 supply relay valve 59B, and to the signal pressure port on the spring-loaded side spool edge of the C3 release valve 66, the C1 release valve 55 and the B1-C3 release valve 56.

A supply path to the C3 clutch hydraulic servo 83 is composed with a C3 solenoid valve (SLC3) 73 that acts to regulate the pressure on the basis of signals from the electronic control apparatus provided on the supply path on the downstream side of the oil path L5 connected to the D range oil path L3 and the R range hydraulic pressure L4 via the B1-C3 release valve 56 and the shuttle valve 68. The C3 solenoid valve 73, in this case, also comprises a spool valve part that acts as a three port pressure-regulating valve that controls the degree of communication of the drain port and the input and output ports by means of a spring-loaded spool, and a three port linear solenoid valve part in which a solenoid load and a spring load are applied opposite each other similar to applying a solenoid pressure to the non-spring-loaded side edge of the spool. Further, the input port of the linear solenoid valve part is connected to the output port of the solenoid modulator valve 54 via the modulator pressure oil path L6, and the output port of the linear solenoid valve part is connected to the signal pressure port of the spool valve part. In the spool valve part, the input port is connected to the above-mentioned supply path L5, the output port is connected to the input port of the C3 release valve 66, and the feedback port that leads to the spool edge on the spring-loaded side is connected to the oil path on the downstream side of the output port via an orifice. In this supply path, the C2 clutch hydraulic servo 83 is connected to the output port of the C3 release valve 66.

A supply path to the B1 brake hydraulic servo 84 is composed with a B1 solenoid valve (SLB1) 74 that acts to regulate the pressure on the basis of signals from the electronic control apparatus provided on the supply path on the downstream side of the oil path L5. The B1 solenoid valve 74, in this case, also comprises a spool valve part that acts as a three port pressure-regulating valve that controls the degree of communication of the drain port and the input and output ports by means of a spring-loaded spool, and a three port linear solenoid valve part in which a solenoid load and a spring load are applied opposite each other similar to applying a solenoid pressure to the non-spring-loaded side edge of the spool. Furthermore, the input port of the linear solenoid valve part is connected to the output port of the solenoid modulator valve 54 via the modulator pressure oil path L6, and the output port of the linear solenoid valve part is connected to the signal pressure port of the spool valve part. In the spool valve part, the input port is connected to the above-mentioned supply path L5, the output port is connected to the input port of the B1 release valve 67, and the feedback port that leads to the spool edge on the spring-loaded side is connected to the oil path on the downstream side of the output port via an orifice. In this supply path, the B1 brake hydraulic servo 84 is connected to the output port of the B1 release valve 67.

The supply path to the B2 brake hydraulic servo 85, unlike the other supply paths, is the supply path of two systems. One of the supply paths is composed of an oil path connected to the R range oil path L4 via the shuttle valve 63, and the other of the supply paths is a supply path from the oil path L5, with the C2-B2 supply relay valve 59B and the B2 control valve 65B provided in series on the oil path L5, and furthermore has the shuttle valve 63 on its downstream side. In this supply path, the solenoid valve 75 for controlling the C2-B2 supply relay valve 59B is a normally-closed three port on/off valve that opens and closes the input and output ports and the drain port by spring-loaded balls. Furthermore, the C2-B2 supply relay valve 59B is a six port switching valve that switches the input and output ports and the drain port of each of two spools. Further, the solenoid valve 75 is such that the input port thereof is connected to the modulator pressure oil path L6, and the output port is connected to the signal pressure port leading to one of the spool edges of the C2-B2 supply relay valve 59B. The C2-B2 supply relay valve 59B is such that one of the input ports is connected to the D range oil path L3, the output port corresponding thereto is connected to the input port of the C2 solenoid valve 72, the other input port is connected to the oil path L5 and the output port corresponding thereto is connected to the input port of the B2 control valve 65B.

Each of the release valves 55, 56, 66 are the exact same spool-type three port switching valves having an input and output ports and a drain port, and have a configuration comprising a two-level different-diameter receptor surface as the diameter of the spring-loaded edge part is shrunk. The signal pressure port leading to the non-spring-loaded side spool edge of each of the release valves 55, 56, 60 is connected to the line pressure oil path L1.

The input port of the C1 release valve 55 is connected to the D range oil path L3, and the output port is connected to the input port of the C1 solenoid valve 71. The signal pressure port leading to the different-diameter receptor part is connected, via an orifice, to the output port of the shuttle valve 62, the input port of which is connected to the supply path of the C3 clutch hydraulic servo 83 and the B1 brake hydraulic servo 84, and the signal pressure port leading to the receptor part on the spring-loaded side spool edge is connected, via an orifice, to the supply path of the C2 clutch hydraulic servo 82.

The input port of the B1-C3 release valve 56 is connected to the output port of the shuttle valve 68, and the output port is connected to the oil path L5. The signal pressure port leading to the different-diameter receptor part is connected via an orifice to the supply path of the C1 clutch hydraulic servo 81, and the signal pressure port leading to the receptor part on the spring-loaded side spool edge is connected via an orifice to the supply path of the C2 clutch hydraulic servo 82.

The input port of the C3 release valve 66 is connected to the output port side of the C3 solenoid valve 73, and the output port is connected to the C3 clutch hydraulic servo 83 and one of the input ports of the shuttle valve 62. The signal pressure port leading to the different-diameter receptor part is connected via an orifice to the supply path of the B1 brake hydraulic servo 84, and the signal port leading to the receptor part of the spring-loaded side spool edge is connected via an orifice to the supply path of the C2 clutch hydraulic servo 82.

The B1 release valve 67 is a spool-type three port switching valve. The signal pressure port leading to the non-spring-loaded side spool edge of the release valve 58 is also connected to the line pressure oil path L1. The input port of the valve 67 is connected to the input port of the B1 solenoid valve 74, and the output port is connected to the other of the input ports of the shuttle valve 62. The signal pressure port leading to the spring-loaded side spool edge is connected to the supply path of the C3 clutch hydraulic servo 83 via an orifice.

The B2 control valve 65B is a spool-type three port switching valve with a plunger of different diameters as the load means. The input port of the valve 65B is connected to the other of the output ports of the C2-B2 supply relay valve 59B, and the output port is connected to the other input port of the shuttle valve 63. Further, the signal pressure port leading to the large diameter side receptor part of the plunger is connected to the output port of the shuttle valve 62, that is connected to the supply path of the C3 clutch hydraulic servo 83 and the B1 brake hydraulic servo 84, the signal pressure port leading to the receptor part on the part side where the plunger and spool abut is connected to the downstream side of the output port via an orifice, and the signal pressure port leading to the receptor part of the spool side is connected to the throttle pressure oil path L7.

As shown enlarged and in detail in FIG. 14, the C2-B2 supply relay valve 59B is a switching valve comprising two spools 59a and 59b of the same diameter having lands at both ends, and a spring 59c that abuts the end of the spool 59b. The valve 59B is composed of a valve part provided with an input port that is connected to the D range oil path L3 and is opened and closed by the land at the bottom end of the spool 59b at the bottom of the diagram, a drain port that is opened and closed by the land of the top end of the spool 59b, and an output port positioned between these two ports, in communication to the input port or the drain port between both lands of the spool 59b, and connected to the oil path L32. Another valve part is provided with an input port connected to the oil path L5 that is opened and closed by the land on the bottom end of the spool 59a at the top of the diagram, a drain port that is opened and closed by the land of the top end of the spool 59a, and an output port positioned between these two ports, in communication to the input port or the drain port between both lands of the spool 59a, and connected to the input port of the B2 control valve 65B. Furthermore, in the abutting parts of both spools, signal pressure ports connected to the oil path L32' linking to the downstream side of the oil path L32 are provided, and in the receptor part of the end side of the spool 59a, a signal pressure port is provided to which the solenoid pressure of the solenoid valve 75 is applied.

With the hydraulic circuit having the above-described composition, in the "N" position of the manual valve 53, the input port linked to the line pressure oil path L1 is closed and all of the output ports are drained. Consequently, the modulator pressure regulated by the solenoid modulator valve 54 directly linked to the line pressure oil path L1 is output to the modulator oil path L6, but each of the solenoid valves 71–74 are signal ON and the solenoid valve 75 is signal OFF. Moreover, the input ports of the solenoid valves 71–74 are all in drain states so hydraulic pressure cannot be supplied, and the solenoid valve 75 is in a state with the input port and output port thereof cut-off. Consequently, output of apply pressure from the solenoid valves 71–74 and application of the solenoid pressure from the solenoid valve 75 does not occur. In addition, line pressure is applied to the spool edge signal pressure ports of the valves 55, 56, 66, 67 connected to the line pressure oil path L1. Hence, these valves are switched to the upper position in the diagram in opposition to the spring force. In addition, the B2 control valve 65B is in the position on the right side in the diagram with the throttle pressure of the throttle pressure oil path L7 applied thereto, and the C2-B2 supply relay valve 59B is in the position on the right side in the diagram under spring force. This communication relationship is the same in the "P" position of the manual valve 53, although the spool positions differ.

When the manual valve 53 is switched to the "D" position, line pressure is also output to the D range oil path L3, so the hydraulic pressure of the D range oil path L3 is supplied to each of the input ports of the solenoid valves 71, 73, 74 and the C2-B2 supply relay valve 59B, excluding the C2 solenoid valve 72. That is, the hydraulic pressure of the D range oil path L3, via the C1 release valve 55, which is in a communicating state in the right side position in the diagram, is supplied to the input port of the C1 solenoid valve 71 on the oil path L3; the hydraulic pressure of the line pressure oil path L1, via the B1-C3 release valve 56 that is in the right side position in the diagram, from the shuttle valve 68 is supplied to the input port of the B1 solenoid valve 74 and the C3 solenoid valve 73 on the supply path L5; and the hydraulic pressure of both of the above-described systems is supplied to the two input ports of the C2-B2 supply relay valve 59B. For the oil path L32 to the input port of the C2 solenoid valve 72, solenoid pressure to the receptor part on the spool 59a end side of the C2-B2 supply relay valve 59B is not applied because of the signal OFF of the solenoid valve 75, and hydraulic pressure from the oil path L32' to the part where both spools abut is not applied either. Consequently, the valve 59B is drained by being in the position to the right side in the diagram under only the energizing force of the spring 59c, and does not achieve a state in which hydraulic pressure is supplied.

Next, the valve action during normal operation will be described. When the signal to the C1 solenoid valve 71 is set to OFF in order to attain first speed, the line pressure of the D range oil path L3 which was supplied as far as the C1 solenoid valve 71 is regulated by the valve 71, becomes apply pressure, and is supplied to the C1 clutch hydraulic servo 81. Through this, the C1 clutch is engaged and works in cooperation with the one-way clutch F-1, so that the first speed is attained. At this time, the apply pressure to the C1 clutch is applied via an orifice to the different-diameter receptor part of the B1-C3 release valve 56, but switching of the B1-C3 release valve 56 does not occur due to the pressure relationship in the valve 56, so the above-mentioned hydraulic pressure supply relationship is maintained. In addition, the C2-B2 supply relay valve 59B is positioned to the right side in the diagram, so the connection between the C2 solenoid valve 72 and the D range oil path L3 is mechanically cut off.

The second speed is attained by setting the signal to the C1 solenoid valve 71 to OFF and the signal to the B1 solenoid valve 74 to OFF. In this state, the B1 solenoid valve 74 enters a regulated pressure state in addition to the apply pressure supply state to the above-mentioned C1 clutch hydraulic servo 81, and the regulated apply pressure is supplied to the B1 brake hydraulic servo 84 via the B1 release valve 67, which is in a position to the left side in the diagram due to the application of line pressure. Through this, the second speed is attained through engagement of the C1 clutch and the maintaining of the B1 brake reaction force. In this state, the apply pressure to the B1 brake is applied via an orifice to the different-diameter receptor part of the C3 release valve 66. Moreover, the apply pressure via the shuttle valve 62 is applied to the different-diameter receptor part of the C1 release valve 55 and the plunger edge receptor part of the B2 control valve 65B. But, because of the balance in pressures received, switching of the C1 release valve 55 does not occur, and in addition, the B2 control valve 65B acts so that the apply pressure to the B1 brake rises as far as a set pressure considerably lower than the line pressure due to the relationship with the throttle pressure on the spool edge, and the connection between the input port of the B2 control valve 65B and the B2 hydraulic servo 85 is mechanically cut off. Because there is no hydraulic pressure supply to the input port, this has no particular relationship with other valves. In addition, the C2-B2 supply relay valve 59B is in a position to the right side in the diagram. Consequently, the connection between the C2 solenoid valve 72 and the D range oil path L3 is mechanically cut off.

The third speed is attained by setting the signal to the C1 solenoid valve to OFF and the signal to the C3 solenoid valve 73 to OFF. In this case, the apply pressure supply state to the above-mentioned C1 clutch hydraulic servo 81 remains unchanged, while the C3 solenoid valve 73 enters a regulated pressure state, and the apply pressure thereof is supplied to the C3 clutch hydraulic servo 83 via the C3 release valve 66, which is positioned to the right side in the diagram. In this manner, the third speed is attained by simultaneous engagement of the C1 clutch and the C3 clutch. Further, the apply pressure to the C3 clutch hydraulic servo 83 is also applied to the spring-loaded side receptor part of the B1 release valve 67, the plunger-end receptor part of the B2 control valve 65B via the shuttle valve 62, and the C1 release valve 55. In addition, when the apply pressure rises as far as a set pressure lower than the line pressure, the B2 control valve 65B switches to the position to the left side in the diagram, and when the apply pressure rises as far as the line pressure, the B1 release valve 67 switches to the position to the right side in the diagram, so the connection between the B2 brake hydraulic servo 82 and the input port of the B2 control valve 65B, and the connection between the B1 solenoid valve 74 and the B1 brake hydraulic servo 84, are mechanically cut off. In addition, the C2-B2 supply relay valve 59B is in the position to the right side in the diagram, so the connection between the C2 solenoid valve 72 and the D range oil path L3 is mechanically cut off.

The fourth speed is attained by setting the signal to the C1 solenoid valve 71 to OFF, setting the signal to the C2 solenoid valve 72 to OFF and setting the signal to the solenoid valve (SL1) 75 to ON. In this state, the apply pressure supply state to the above-mentioned C1 clutch hydraulic servo 81 remains unchanged, while the hydraulic pressure output by the solenoid valve 75 is applied to the non-spring-loaded side spool edge receptor part of the C2-B2 supply relay valve 59B, and the valve 59B switches to the position at the left side in the drawing. Consequently, the hydraulic pressure of the D range oil path L3 is supplied to the C2 solenoid valve 72 by the oil path L32. Through this, the C2 solenoid valve 72 enters an apply pressure regulated pressure state, and the apply pressure is supplied to the C2 clutch hydraulic servo 82. The apply pressure, on the one hand, is applied to the receptor part of the spring-loaded edge side of the C1 release valve 55, and, on the other hand, is applied to the spring-loaded side receptor part of the C3 release valve 66 and the spring-loaded edge receptor part of the B1-C3 release valve 56. Moreover, the apply pressure is also applied to the receptor part between spools of the C2-B2 supply relay valve 59B. Through this, the B1-C3 release valve 56, when the apply pressure rises as far as the line pressure, switches to the position on the left side in the diagram, and mechanically cuts off the connection between the D range oil path L3 and the B1 solenoid valve 74 along with the C3 solenoid valve 73. In addition, the spool on the bottom in the diagram on the C2-B2 supply relay valve 59B is maintained in the position to the left side in the diagram. When the maintained state is established in this way, the ON signal of the solenoid valve 75 becomes unnecessary, and is returned to OFF with the appropriate timing. That is, the signal to the solenoid valve 75 becomes ON only when changing speeds, and is set to OFF in the standing state after completion of a speed change. In this manner, the fourth speed is attained by simultaneous engagement of the C1 and C2 clutches.

The fifth speed is attained by setting the signal to the C2 solenoid valve (SLC2) 72 to OFF, setting the signal to the C3 solenoid valve (SLC3) 73 to OFF and setting the signal to the solenoid valve (SL1) 75 to ON. In this state, the apply pressure to the C2 clutch hydraulic servo 82 is similarly applied to the same valves as in the fourth speed, and the apply pressure to the C3 clutch hydraulic servo 83 is similarly applied to the same valves as in the third speed. From the combination relationship of the hydraulic pressure application, both apply pressures are applied to the spring-loaded side receptor part and the different-diameter receptor part of the C1 release valve 55. When the hydraulic pressures rise as far as the line pressure, the C1 release valve 55 switches to the position on the left side in the diagram, and mechanically cuts off the connection between the C1 solenoid valve 71 and the D range oil path 73. However, this action is unrelated to other valve actions. Through this, the fifth speed is attained through the simultaneous engagement of the C2 and C3 clutches.

The sixth speed is attained by setting the signal to the C2 solenoid valve 72 to OFF, setting the signal to the B1 solenoid valve 74 to OFF and setting the signal to the solenoid valve 75 to ON. In this state, the action through the hydraulic pressure output from the solenoid valve (SL1) 75 is the same as in the abovedescribed fourth and fifth speeds. In addition, apply pressure to the B1 brake hydraulic servo 84 is similarly applied to the same valves as in second speed. In this case, both apply pressures are applied to the spring-loaded side receptor part and the different-diameter receptor part of the C3 release valve 66, and by the hydraulic pressures rising as far as the line pressure, the C3 release valve 66 switches to the position on the left side in the diagram and mechanically cuts off the connection between the C3 solenoid valve 73 and the C3 clutch hydraulic servo. Further, both apply pressures are also applied to the spring-loaded side receptor part and the different-diameter receptor part of the C1 release valve 55. When the hydraulic pressures have risen as far as the line pressure, the C1 release valve 55 switches to the position on the left side in the diagram, and mechanically cuts off the connection between the C1 solenoid valve 71 and the D range oil path L3. However, this action is unrelated to the other valve actions. Accordingly, the sixth speed is attained by engagement of the C2 clutch and maintenance of the reaction force of the B1 brake.

In addition, reverse is attained by switching the manual valve 53 to the "R" position, and setting the signal to the C3 solenoid valve 73 to OFF. In this case, the D range oil path L3 is drained, but line pressure is output to the R range oil path L4, and the hydraulic pressure is directly supplied to the B2 brake hydraulic servo 85 via the shuttle valve 63. On the one hand, the line pressure of the R range oil path L4 is supplied to the input port of the B1-C3 release valve 56 via the shuttle valve 68, and the hydraulic pressure is supplied to the C3 solenoid valve 73 via the B1-C3 release valve 56, which is positioned to the right side in the diagram by the normally-applied line pressure, and from the C3 solenoid valve 73, which is in an apply pressure output state through the signal being OFF, and is supplied to the C3 clutch hydraulic servo 83 via the C3 release valve 66 which is positioned to the right side in the diagram by the normally-applied line pressure. Through this, reverse speed is attained by engagement of the C3 clutch and maintenance of the reaction force of the B2 brake.

Next, the actions during failure of the hydraulic control apparatus in a normal hydraulic pressure supply state, such as described above, will be explained. In this case, each of the normally-open solenoid valves 71–74 are all in an apply pressure supply state, and the normally-closed solenoid valve 75 is in a solenoid pressure cut-off state. Looking first at the state when the first speed has been attained, the C2 solenoid valve 72 does not enter the apply pressure output state because the input port thereof is in a drain state via the C2-B2 supply relay valve 59B, but the other two valves, namely the C3 solenoid valve 73 and the B1 solenoid valve 74, are in an apply pressure output state. Through this, the attempt is made for the apply pressure of the C3 solenoid valve 73 to be supplied to the C3 clutch hydraulic servo 83 via the C3 release valve 66 which is in a communicating state, and for the apply pressure of the B1 solenoid valve 74 to be supplied to the B1 brake hydraulic servo 84 via the B1 release valve 67 which is in a communicating state. However, the B1 release valve 67 is such that the apply pressure to the C3 clutch hydraulic servo 83 is applied to the spring-loaded side spool edge via an orifice, so the valve 67 switches to the position on the left side in the diagram in opposition to application of the line pressure, the apply pressure is cut off, and the B1 brake hydraulic servo 84 is switched to drain communication. The supply path to the B2 brake hydraulic servo 85 is cut off because the solenoid valve 75, which is normally closed, does not change with respect to its normal status, and because this is drained by the C2-B2 supply release valve 59B, an apply pressure supply state does not occur. Accordingly, during the first speed failure, upshifting occurs to the third speed attainment state with the C1 clutch and the C3 clutch simultaneously engaging.

When the second speed has been attained, initially the B1 brake hydraulic servo 84 is in an apply pressure supply state under the action of the B1 solenoid valve 74, but when failure occurs, the C3 solenoid valve 73 attains an apply pressure supply state, and, as a result, the same hydraulic pressure state as in the first speed failure occurs. Accordingly, in this case also, the apply pressure of the B1 solenoid valve, which is supplied to the B1 brake hydraulic servo via the B1 release valve 67 that is in a communicating state, is cut off by the B1 release valve 67 which is switched to the position to the right side in the diagram by the apply pressure to the C3 clutch hydraulic servo 83 being applied to the spring-loaded side spool edge via an orifice, and the B1 brake hydraulic servo 84 switches to drain communication. Accordingly, during the second speed failure, upshifting also occurs to the third speed attainment state with the C1 clutch and the C3 clutch simultaneously engaging.

Next, when the third speed has been attained, from the outset there is apply pressure to the C3 clutch hydraulic servo 83. Consequently, the B1 release valve 67 is in a drain communication state with apply pressure cut-off to the B1 brake hydraulic servo 84 that is positioned to the left side in the diagram. Hence, even during a failure, no change occurs relative to the normal hydraulic pressure supply. Accordingly, during the third speed failure, the C1 clutch and the C3 clutch remain in a simultaneously engaged state, and the third speed attainment state is maintained.

Next, when the fourth speed has been attained, initially there is an apply pressure state to the C1 clutch hydraulic servo 81 and the C2 clutch hydraulic servo 82, and the input ports to the other two valves, namely the C3 solenoid valve 73 and the B1 solenoid valve 74, are in a drain communication state with the supply path L5 cut off by the B1-C3 release valve 56. Thus, even if both of the valves are set to signal OFF by a failure, output of the apply pressure does not occur. In addition, if a signal to the solenoid valve 75 is set to OFF by a failure, because the signal to the valve 75 is normally in an OFF state as discussed above, there is no effect on the action of the C2-B2 supply relay valve 59B. That is to say, in this circuit, the spool of the C2 supply relay valve 59B on the downward side in the diagram is self-maintained in the position on the right side in the diagram by the apply pressure to the C2 clutch hydraulic servo 82. Consequently, the supply of apply pressure from the C2 solenoid valve 72 to the C2 clutch hydraulic servo 82 is maintained without impediment. Further, the supply path reaching the B2 brake hydraulic servo 85 via the valve 59B is also in a drain communication state with the supply path L5 cut off by the B1-C3 release valve 56, so the drain communication state of the B2 brake hydraulic servo 85 also does not change. Accordingly, during the fourth speed failure, the apply pressure supply state to the C1 clutch hydraulic servo 81 and the C2 clutch hydraulic servo 82 is maintained without change from the outset, so the fourth speed attainment state is maintained.

Next, when the fifth speed has been attained, initially the C2 clutch hydraulic servo 82 and the C3 clutch hydraulic servo 83 are in a state with apply pressure supplied, and the supply of hydraulic pressure to the C1 solenoid valve 71 is mechanically cut off by overlapping application of the C3 clutch apply pressure and the C2 clutch apply pressure to the C1 release valve 55. Thus, even if the C1 solenoid valve 71 is in a control state due to a signal OFF caused by a failure, apply pressure is not supplied to the C1 clutch hydraulic servo 81. Similarly, the supply path to the B1 brake hydraulic servo 84 is cut off by the B1 release valve 67 to which the C3 clutch apply pressure is applied and, consequently, even if the B1 solenoid valve 74 is in a control state due to a signal OFF caused by a failure, apply pressure is not supplied to the B1 brake hydraulic servo 84. The state of the C2-B2 supply relay valve 59B caused by a signal OFF to the solenoid valve 75 at this time is the same as in the fourth speed failure case. Accordingly, even during the fifth speed failure, no change occurs in the engagement status of the C2 clutch and the C3 clutch, and the fifth speed attainment state is maintained.

Next, when the sixth speed has been attained, initially the C2 clutch hydraulic servo and the B1 brake hydraulic servo 84 are in a state with apply pressure supplied, and through this, the supply path L31 to the C1 solenoid valve 71 is cut off by the C1 release valve 55 for the same reason as in the fifth speed case. Consequently, even if the C1 solenoid valve 71 is in a control state due to a signal OFF caused by a failure, apply pressure is not supplied to the C1 clutch hydraulic servo 81. In addition, the supply path from the C3 solenoid valve 73 to the C3 clutch hydraulic servo 83 is cut off by the C3 release valve 66 which is in the position to the left side in the diagram with C3 clutch apply pressure and B1 brake apply pressure overlappingly applied, so that even if the C3 solenoid valve 73 is in a control state due to a signal OFF caused by a failure, apply pressure is not supplied to the C3 clutch hydraulic servo 83. The state of the C2-B2 supply relay valve 59B caused by a signal OFF to the solenoid valve 75 at this time is the same as in the fourth speed failure case. Accordingly, during the sixth speed failure, engagement of the C2 clutch and the B1 brake is maintained, and the sixth speed attainment state is maintained.

When the reverse speed is attained, the line pressure supply itself to the D range oil path L3 from the manual valve 53 disappears and, consequently, reverse speed is maintained without regard to failures in each solenoid valve.

Furthermore, in this circuit structure, when the hydraulic pressure of the D range oil path L3 is once drained due to the switching of the position of the manual valve 53 or a drop in pressure due to stopping of the oil pump because the engine was turned off, and then the valve is switched to the D position again, by means of a signal OFF of the solenoid valve 75, a state is achieved in which apply pressure is output from all three solenoid valves 71, 73, 74, excluding the C2 solenoid valve 72 which is cut off from communication to the D range oil path L3 by the C2-B2 supply relay valve 59B. However, even in this case, the same oil path connections occur as in the above-described failure state during the second speed, and the apply pressure to the B1 solenoid valve 74 is cut off by the B1 release valve 67, while the B1 brake hydraulic servo 84 achieves drain communication. Consequently, only the apply pressure supplied to the C1 clutch hydraulic servo 81 and the C3 clutch hydraulic servo 83 are effective. Accordingly, in this case, third speed is also attained through the simultaneous engagement of the C1 clutch and the C3 clutch, and movement and progress in the third speed become possible.

FIG. 15 is a table comparing and contrasting the relationships among the hydraulic pressure supply of each hydraulic servo, the speeds and the action of each valve in the hydraulic control apparatus of this embodiment. As shown in the figure, in the first through third speeds and in the restart case, the drain element that prevents engagement of the C2 clutch (C-2) is the C2-B2 supply relay valve indicated by the reference number (5); the drain element that prevents engagement of the B2 brake in the second through sixth speeds and in the restart case is the B2 control valve indicated by the reference number (6); the drain element that prevents engagement of the B1 brake (B-1) in the third and fifth speeds and in the restart case is the B1 release valve indicated by the reference number (4); the drain element that prevents engagement of the C3 clutch and B1 brake in the fourth speed is the B1-C3 release valve indicated by the reference number (2); the drain element that prevents engagement of the C1 clutch in the fifth and sixth speeds is the C1 release valve indicated by the reference number (1); and the drain element that prevents engagement of the C3 clutch in the sixth speed is the C3 release valve indicated by the reference number (3).

Figure 16:
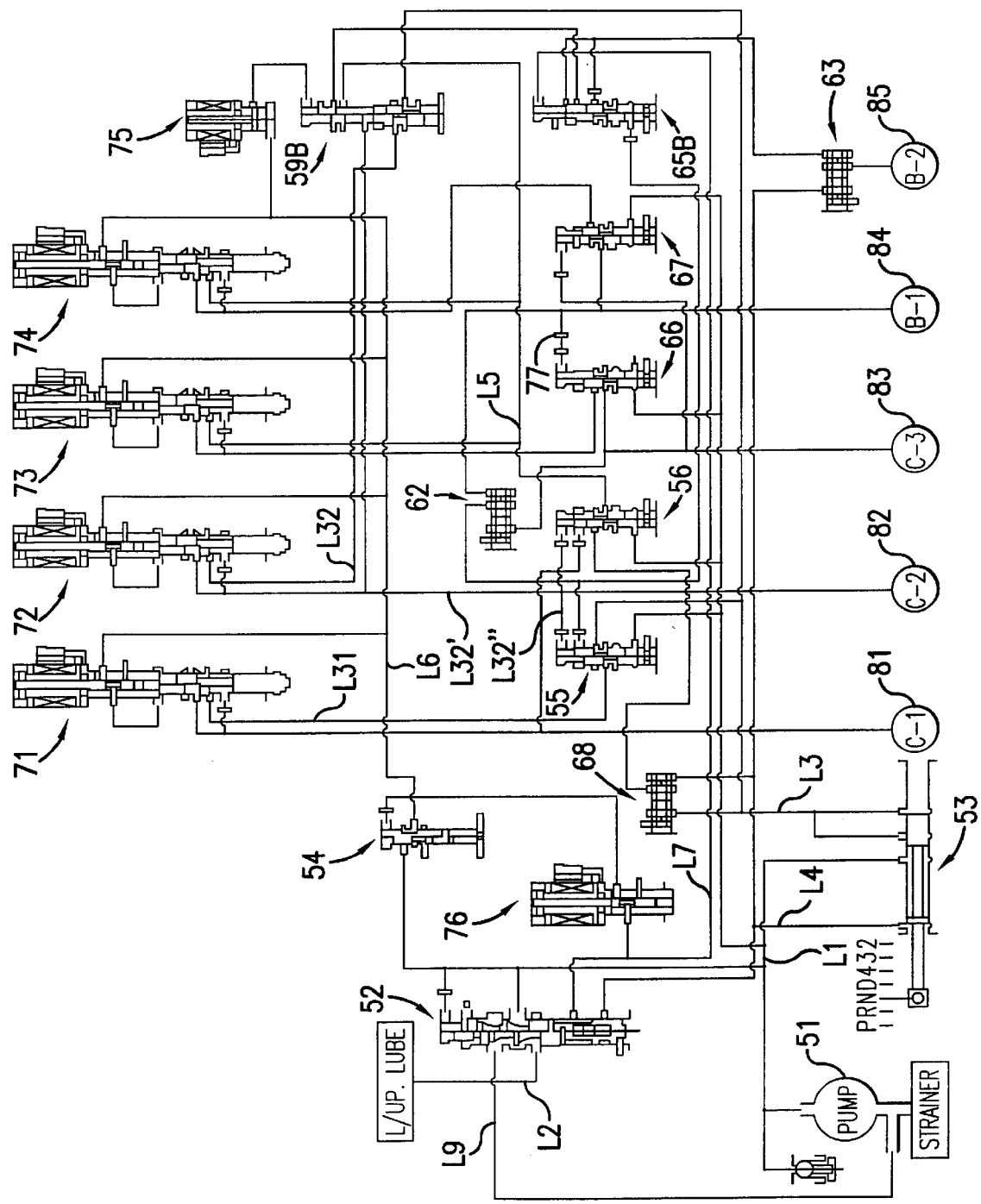
FIG. 16 is a circuit diagram of the hydraulic control apparatus of the sixth embodiment.

Finally, FIGS. 16 and 17 show a sixth embodiment of the invention. As shown by the circuit structure of FIG. 16, in this embodiment a structure is employed wherein the C3 release valve 66 switches only by means of the apply pressure to the B11 brake hydraulic servo 84. Accompanying this change, the oil path through which the hydraulic pressure of the C2 clutch hydraulic servo 82 is applied is eliminated. Further, an orifice 77, that delays application of signal pressure, is added to the signal pressure oil path through which the apply pressure to the B1 brake hydraulic servo 84 is applied to the spring-loaded side receptor part of the C3 release valve 66. The remainder of the circuit structure is the same as in the fifth embodiment, so an explanation of such is omitted here.

In this manner, when the structure is employed wherein the C3 release valve 66 is switched by application of a single signal pressure, an apply pressure supply state occurs simultaneously in the C3 clutch hydraulic servo 83 and the B1 brake hydraulic servo 84 during failure. If, by chance, this were to cause the supply to the B1 brake hydraulic servo 84 to occur first, switching (the spool moving to the right side position in the diagram) of the C3 release valve 66 would occur, the hydraulic pressure supply to the C3 clutch hydraulic servo 83 would be stopped and third speed could not be attained. However, in the sixth embodiment, this is prevented by delaying the signal pressure supply to the C3 release valve 66 by means of the orifice 77, so the hydraulic pressure supply to the C3 clutch hydraulic servo 83 occurs in advance of the switching of the C3 release valve 66. Accordingly, with this structure the hydraulic pressure is applied to the B1 release valve 67 first through the hydraulic pressure supply to the C3 clutch hydraulic servo 83, the B1 brake hydraulic servo 84 enters drain communication due to the switching of the B1 release valve 67, and the same circuit switching action as in the above-described first embodiment is obtained.

FIG. 17 is a table comparing and contrasting the relationships among the hydraulic pressure supply of each hydraulic servo, the speeds and the action of each valve in the hydraulic control apparatus of this embodiment. As is clear from comparing this table with the table in FIG. 15, of the fifth embodiment, the differences between the two are only that the C3 release valve, indicated by the reference number (3) in the figure, is used as the second speed drain element during failures and the difference in the signal pressure during drain operations.

The foregoing has been an explanation of the invention with reference to six embodiments, but the concepts of the invention are not limited to the hydraulic circuits illustrated. The concepts could also be applied to broader, more general hydraulic control circuits. In addition, in the illustrated embodiments a control means cum operation means is formed from a pressure regulating valve comprising a spool valve part and a linear solenoid valve part. The linear solenoid valve part functions as a control means and the spool valve part functions as the operation means. Solenoid pressures output from the linear solenoid valve part of the pressure regulating valve to a switch location having priority based upon the relationship of the order of partial switching operations is used as a signal pressure applied to the priority switching valve, each of the remaining switching valves receive pressure output from the spool valve part. It is also possible to create a circuit structure in which the pressure outputs from the spool valve part and the linear solenoid valve part are unified into one output hydraulic pressure. Further, a circuit structure is possible in which the control means cum operation means are a unitary valve comprising either a linear solenoid valve or a duty solenoid valve. Lastly, a structure in which the control means and the operation means are separate valves is also possible.

What is claimed is:

1. A hydraulic control apparatus for an automatic transmission, of the type of hydraulic control apparatus provided with a plurality of friction elements and hydraulic servos for operating such, wherein a plurality of speeds can be achieved by engaging at least two friction elements at a time out of said plurality of friction elements, the hydraulic control apparatus provided with a switching means for cutting off hydraulic control to the friction elements other than the friction elements engaged in order to achieve each speed within said plurality of speeds, wherein said plurality of speeds includes a third speed which, from among the friction elements, engages at least the first and third friction elements and disengages the second friction element, a fourth speed which engages the first and second friction elements and disengages the third friction element, and a fifth speed which engages the second and third friction elements and disengages the first friction element; and, said switching means includes a first switching valve which cuts off hydraulic control to said first friction element by applying, as a signal pressure, hydraulic pressure to the third friction element engaged in at least said third and fifth speeds and the second friction element engaged in said fifth speed, and a second switching valve that cuts off hydraulic control to said third friction element by applying, as a signal pressure, hydraulic pressure to the first friction element engaged in said third and fourth speeds and the second friction element engaged in said fourth speed.

2. The hydraulic control apparatus for an automatic transmission according to claim 1, further equipped with a plurality of control means capable of adjusting the hydraulic pressure to each hydraulic servo that operate said plurality of friction elements;

wherein the hydraulic pressure from the plurality of control means is provided to each of said hydraulic servos.

3. The hydraulic control apparatus for an automatic transmission according to claim 1, provided with a hydraulic pressure source and first and second oil paths connecting said hydraulic pressure source with the hydraulic servos of said first and third friction elements, such that from among said plurality of control means, the first and second control means are positioned on the first and second oil paths; and said first and second switching valves are respectively positioned on said first and second oil paths, and cut off the supply of hydraulic pressure from said hydraulic pressure source to said other hydraulic servos by a hydraulic pressure being applied on the downstream side of the control means regulating the hydraulic pressure to the engaged friction elements.

4. The hydraulic control apparatus for an automatic transmission according to claim 1, wherein said switching means is such that the hydraulic pressure other than the pressure on said other friction elements, to which the hydraulic pressure supply is cut off, is applied as a signal pressure.

5. The hydraulic control apparatus for an automatic transmission according to claim 1, wherein said plurality of friction elements further includes a fourth friction element, said fourth friction element is disengaged in said third, fourth and fifth speeds.

6. The hydraulic control apparatus for an automatic transmission according to claim 1, wherein said plurality of speeds further includes a second speed that engages the first and fourth friction elements and disengages the second and third friction elements, and a sixth speed that engages the second and fourth friction elements and disengages the first and third friction elements; and, said first switching valve cuts off the hydraulic pressure supply to said first friction element by applying, as a signal pressure, a hydraulic pressure to the fourth friction element that is engaged at least in the case of said second speed, and a hydraulic pressure on the second friction element engaged in the case of said sixth speed.

7. The hydraulic control apparatus for an automatic transmission according to claim 1, wherein said switching means includes a third switching valve capable of cutting off the hydraulic pressure supply to said second friction element, and said third switching valve is operated by hydraulic pressure to a friction element that engages in speeds where said second friction element is disengaged.

8. The hydraulic control apparatus for an automatic transmission according to claim 1, wherein said switching means includes a third switching valve capable of cutting off the hydraulic pressure supply to said second friction element, wherein said third switching valve is operated by hydraulic pressure other than the hydraulic pressure to a friction element that engages in speeds where said second friction element is disengaged.

9. The hydraulic control apparatus for an automatic transmission according to claim 8, wherein said hydraulic pressure other than the hydraulic pressure to a friction element is a solenoid pressure output by electrical control.

10. The hydraulic control apparatus for an automatic transmission according to claim 1, wherein the first switching valve capable of cutting off the hydraulic pressure supply to said first friction element has a first operating means that operates switching of said first switching valve.

11. The hydraulic control apparatus for an automatic transmission according to claim 10, wherein said first operating means cuts off the hydraulic pressure supply to said first friction element by switching said first switching valve by means of hydraulic pressure to the friction elements engaged in the fifth speed, in which the second and third friction elements are engaged and the first and fourth friction elements are disengaged, and friction elements engaged in the sixth speed, in which the second and fourth friction elements are engaged and the first and third friction elements are disengaged.

12. The hydraulic control apparatus for an automatic transmission according to claim 1, wherein said switching means is composed of a first group of switching valves capable of cutting off the hydraulic pressure supply to the third friction element, and said first group of switching valves has a first group of operating means for operating the switching thereof.

13. The hydraulic control apparatus for an automatic transmission according to claim 12, wherein said first group of operating means cuts off the hydraulic pressure supply to said third friction element by switching said first group of switching valves by means of hydraulic pressure to the friction elements engaged in the fourth speed, in which the first and second friction elements are engaged and the third and fourth friction elements are disengaged, and friction elements engaged in the sixth speed, in which the second and fourth friction elements are engaged and the first and third friction elements are disengaged.

14. The hydraulic control apparatus for an automatic transmission according to claim 12, wherein said first group of switching valves comprises a first switching valve of the first group and second switching valves of the first group, and said first switching valve of the first group cuts off the hydraulic pressure supply to said third friction element through hydraulic pressure to the friction elements engaged in the fourth speed in which the first and second friction elements engage and the third and fourth friction elements disengage, and said second switching valves of the first group cut off the hydraulic pressure supply to said third friction element through hydraulic pressure to the friction elements engaged in the sixth speed in which the second and fourth friction elements engage and the first and third friction elements disengage.

15. The hydraulic control apparatus for an automatic transmission according to claim 1, wherein said switching means includes a second group of switching valves capable of cutting off the hydraulic pressure supply to the fourth friction element, and is further provided with a second group of operating means for operating switching of said second group of switching valves.

16. The hydraulic control apparatus for an automatic transmission according to claim 15, wherein said second group of operating means cuts off the hydraulic pressure supply to said fourth friction element by switching said second group of switching valves through hydraulic pressure to the friction elements engaged in a third speed in which the first and third friction elements engage and the second and fourth friction elements disengage, fourth speed in which the first and second friction elements engage and the third and fourth friction elements disengage, and the fifth speed in which the second and third friction elements engage and the first and fourth friction elements disengage.

17. The hydraulic control apparatus for an automatic transmission according to claim 15, wherein said second group of switching valves comprises a first switching valve of the second group and second switching valves of the second group, and said first switching valve of the second group cuts off the hydraulic pressure supply to said fourth friction element by means of hydraulic pressure to the friction elements engaged in the fourth speed in which the first and second friction elements engage and the third and fourth friction elements disengage, and said second switching valves of the second group cuts off the hydraulic pressure supply to said fourth friction element by switching said second group of switching valves by means of hydraulic pressure to the friction elements engaged in third speed in which the first and third friction elements engage and the second and fourth friction elements disengage, and the fifth speed in which the second and third friction elements engage and the first and fourth friction elements disengage.

18. The hydraulic control apparatus for an automatic transmission according to claim 2, wherein said switching means includes a third switching valve capable of cutting off the supply of hydraulic pressure to said second friction element, and is further provided with a third operating means that operates switching of said third switching valve.

19. The hydraulic control apparatus for an automatic transmission according to claim 18, wherein said third operating means cuts off the hydraulic pressure supply to said second friction element by switching said third switching valve by means of hydraulic pressure to the friction elements engaged in the second speed in which the first and fourth friction elements engage and the second and third friction elements disengage, and the third speed in which the first and third friction elements engage and the second and fourth friction elements disengage.

20. The hydraulic control apparatus for an automatic transmission according to claim 1, wherein said switching means includes a third switching valve capable of cutting off the supply of hydraulic pressure to said second friction element, and is further provided with a third operating means for operating switching of said third switching valve.

21. The hydraulic control apparatus for an automatic transmission according to claim 20, wherein said third operating means is capable of cutting off the supply of hydraulic pressure to said second friction elements by means of hydraulic pressure unrelated to the hydraulic pressure to the friction elements engaged in speeds in which said second friction element disengages.

22. The hydraulic control apparatus for an automatic transmission according to claim 17, wherein said second switching valve of the second group cuts off the supply of hydraulic pressure to said fourth friction element by means of hydraulic pressure to said third friction element.

23. The hydraulic control apparatus for an automatic transmission according to claim 15, wherein said second switching valve of the first group cuts off the supply of hydraulic pressure to said third friction element by means of hydraulic pressure to said second friction element and fourth friction element.

24. The hydraulic control apparatus for an automatic transmission according to claim 14, wherein said second switching valve of the first group cuts off the supply of hydraulic pressure to said third friction element by means of hydraulic pressure to said fourth friction element.

25. A hydraulic control apparatus for an automatic transmission, of the type of hydraulic control apparatus provided with a plurality of friction elements and hydraulic servos for such, and wherein a plurality of speeds are achieved by appropriate operation of said plurality of friction elements, and at least one friction element out of said friction elements is engaged in two or more speeds, wherein
  a plurality of switching valves capable of cutting off the supply of hydraulic pressure to each of the hydraulic servos are provided between the hydraulic pressure source and each of the hydraulic servos that operate said plurality of friction elements;
  at least two friction elements of the plurality of friction elements are engaged to achieve a predetermined speed of the plurality of speeds;
  operating means for operating switching of a specific switching valve out of said plurality of switching valves so that the supply of hydraulic pressure is cut off to the friction elements disengaged in the predetermined speed out of said plurality of speeds, the operating means including a first operating means and a second operating means for adjusting the hydraulic pressures supplied to the at least two friction elements engaged at the predetermined speed;

when the specific switching valve receives the hydraulic pressure supplied from one of the first operating means and the second operating means, the specific switching valve permits the supply of a hydraulic pressure to a hydraulic servo for a friction element which should be disengaged in the predetermined speed; and when the specific switching valve receives the hydraulic pressures supplied from both the first operating means and the second operating means, the specific switching valve cuts off the hydraulic pressure supplied to the hydraulic servo for the friction element which should be disengaged in the predetermined speed.

26. The hydraulic control apparatus for an automatic transmission according to claim 25, wherein said plurality of friction elements includes at least first through fourth friction elements;

said plurality of switching valves includes first through fourth switching valves that are positioned between said hydraulic pressure source and each hydraulic servo that operates said first through fourth friction elements, and that are capable of cutting off the supply of hydraulic pressure to the respective hydraulic servos; and said operating means includes first through fourth operating means that operate switching of said first through fourth switching valves so that the hydraulic pressure is cut off to the friction elements disengaged at a predetermined speed out of said plurality of speeds.

* * * * *